(12) United States Patent
Nishiura et al.

(10) Patent No.: US 8,397,349 B2
(45) Date of Patent: Mar. 19, 2013

(54) CABLE CONNECTION STRUCTURE

(75) Inventors: Takeshi Nishiura, Nissin (JP); Atsuki Sasaki, Nagoya (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 550 days.

(21) Appl. No.: 12/675,281

(22) PCT Filed: Apr. 3, 2008

(86) PCT No.: PCT/JP2008/056671
§ 371 (c)(1),
(2), (4) Date: Apr. 29, 2010

(87) PCT Pub. No.: WO2009/034733
PCT Pub. Date: Mar. 19, 2009

(65) Prior Publication Data
US 2010/0247235 A1 Sep. 30, 2010

(30) Foreign Application Priority Data
Sep. 13, 2007 (JP) .................................. 2007-237919

(51) Int. Cl.
*B60N 2/42* (2006.01)
*F16C 1/10* (2006.01)
*F16C 1/26* (2006.01)

(52) U.S. Cl. .................... 24/115 R; 74/502.4; 74/500.5; 74/501.5 R; 74/501.6; 74/502.6; 74/503; 297/216.12; 297/463.1

(58) Field of Classification Search ................ 24/115 R; 74/502, 502.4, 500.5, 501.5 R, 501.6, 502.6, 74/503, 488, 489, 523, 483 PB; 297/216.12, 463.1
See application file for complete search history.

(56) References Cited

U.S. PATENT DOCUMENTS

| 2009/0267389 A1 | 10/2009 | Otsuka |
| 2009/0315371 A1 | 12/2009 | Shimizu et al. |
| 2009/0317176 A1 | 12/2009 | Shimizu et al. |

FOREIGN PATENT DOCUMENTS

| JP | 5-32820 | 4/1993 |
| JP | 2001-208036 | 8/2001 |
| JP | 2003-299549 | 10/2003 |
| JP | 2005-104259 | 4/2005 |
| JP | 2007-71262 | 3/2007 |

*Primary Examiner* — Robert J Sandy
*Assistant Examiner* — Michael Lee
(74) *Attorney, Agent, or Firm* — Greenblum & Bernstein, P.L.C.

(57) ABSTRACT

A connection end portion of an inner member is provided with engagement projections and a connection end portion of a stay is formed with reception grooves that are capable of axially receiving the engagement projections. When operation cable is axially inserted into a cylindrical support, the engagement projections are axially received in insertion grooves and are then transferred to terminal end positions thereof that are bent in one circumferential direction by a spring force of a spring member, so as to be elastically retained therein. When the stay is axially inserted into the cylindrical support in this condition, the engagement projections are axially received in the reception grooves and are then moved to terminal end positions thereof that are bent in the other circumferential direction. As a result, the operation cable is positioned in a condition in which the operation cable is suspended in the stay.

2 Claims, 17 Drawing Sheets

CABLE CONNECTION STRUCTURE

TECHNICAL FIELD

The present invention relates to a cable connection structure. More particularly, the present invention relates to a cable connection structure in which two cables are axially connected to each other.

BACKGROUND ART

Conventionally, there is a vehicle seat having a mechanism that is capable of instantaneously moving a headrest forwardly so as to support a head of a sitting person when a vehicle back-side collision happens. An operation mechanism for moving the headrest forwardly is known. In the operation mechanism, an operation cable is pulled by a seat back loading that is produced by the sitting person when the vehicle back-side collision happens, so that the headrest is moved. This operation cable is disposed so as to extend from inside of the headrest to inside of the seat back through a stay that may function as a support pillar thereof. Therefore, in a case that the headrest is constructed to be detachable with respect to the seat back, it is necessary to take various structural measures in order to dispose the operation cable. For example, the operation cable is divided to two portions. The divided portions are respectively previously disposed in the headrest and the seat back, so that end portions thereof can be connected to each other when the headrest is attached to the seat back.

Japanese Laid-Open Patent Publication No. 2003-299549 teaches a technique in which electrical cables separately disposed within a headrest and a seat back can be connected to each other during headrest attaching operation. According to this technique, one of the electrical cables is inserted into a tubular stay of the headrest. A connection terminal of the cable is retained at a lower end of the stay. Conversely, the other of the electrical cables is also inserted into a cylindrical stay-insertion support that is disposed in an upper portion of the seat back. A connection terminal of the cable is retained within the cylindrical support while it is maintained in a standby condition for connection.

The connection terminals of both of the electrical cables can be coupled and axially integrally connected to each other when the stay is inserted into the cylindrical support. When the stay is operated in an insertion direction from a position in which the electrical cables are connected, an operational force is produced to cancel a condition in which the connection terminal of the electrical cable is retained in the cylindrical stay-insertion support. Thus, in a condition in which the electrical cables are connected, the stay can be inserted into a desired position in which the stay is stopped.

However, in the conventional technique described above, connection end portions of the electrical cables are moved to be axially overlapped, thereby forming a connecting structure in which claws formed in the connection end portions elastically engage with each other. Therefore, a connecting condition of the electrical cables can be released by inserting the stay into the support or pulling the stay from the support.

Thus, there is a need in the art to securely connect connection end portion of two cables by axially overlapping the connection end portions so as to be prevented from being disengaged.

SUMMARY OF THE INVENTION

That is, the present invention is a cable connection structure for axially connecting a first cable and a second cable to each other. Axial connection of the first cable and the second cable is performed by a cylindrical connection member that is constrained from axially moving. A connection end portion of the first cable is provided with a radially outwardly projected engagement projection, and a connection end portion of the second cable is formed with an axially extended reception groove that is capable of axially receiving the engagement projection. The first cable is constructed such that when the connection end portion of the first cable is inserted axially into the cylindrical connection member from one side, the engagement projection can be axially received along an insertion groove that is formed in the cylindrical connection member. The insertion groove is shaped such that an axial terminal end portion of the insertion groove into which the engagement projection is inserted is bent in one circumferential direction. When the engagement projection reaches a terminal end position of the insertion groove, the engagement projection is maintained in a condition in which dual-directional axial movement thereof with respect to the connection member is restrained. A reception groove formed in the connection end portion of the second cable is shaped such that an axial terminal end portion of the reception groove into which the engagement projection is inserted is bent in the other circumferential direction opposite to the insertion groove. When the connection end portion of the second cable is axially inserted into the cylindrical connection member from the other side thereof, the engagement projection of the first cable retained in the cylindrical connection member is axially received along the reception groove of the second cable. When the engagement projection reaches a terminal end position of the reception groove that is bent in the other circumferential direction, the engagement projection is removed from the terminal end position of the insertion groove of the connection member and as a result, the engagement projection is released from a condition in which axial movement thereof with respect to the connection member is restrained and is placed in a condition in which axial movement thereof with respect to the second cable is restrained. In the condition in which the engagement projection reaches the terminal end position of the reception groove of the second cable and axial movement thereof is restrained, the engagement projection is retained in the terminal end portion of the reception groove by an axially extended portion of the insertion groove that is formed in the connection member and as a result, the cables can be axially integrally connected to each other so as to axially move while the cables are integrated with each other. The first cable is provided with a spring member that is capable of engaging the connection member and rotationally biasing the connection end portion of the first cable in one circumferential direction when the first cable is inserted into the connection member. The engagement projection provided to the connection end portion of the first cable is transferred to the terminal end position of the insertion groove that is bent in one circumferential direction by a biasing force of the spring member, so as to be elastically retained therein.

According to the structure of the present invention, upon insertion of the connection end portion of the first cable into the cylindrical connection member, the engagement projection can be axially received in the insertion groove of the connection member. Thus, the spring member attached to the first cable engages the connection member, so that the connection end portion can be rotationally biased in one circumferential direction. Therefore, upon axial insertion of the first cable, the engagement projection is transferred to the terminal end position of the insertion groove that is bent in one circumferential direction by the biasing force of the spring member. As a result, the connection end portion of the first cable can be elastically retained in the terminal end position of the insertion groove, so that the first cable is maintained in the condition in which the dual-directional axial movement thereof with respect to the connection member is restrained. In this condition, when the connection end portion of the second cable is axially inserted into the cylindrical connection member from the other side thereof, the engagement projection retained in the terminal end position of the insertion groove is axially received along the reception groove of the second cable. When the second cable is further inserted, the engagement projection reaches the terminal end position of the reception groove that is bent in the other circumferential direction. As a result, the engagement projection is removed from the terminal end position of the insertion groove, so that the first cable is released from the condition in which the axial movement thereof with respect to the connection member is restrained and is placed in the condition in which the first cable is integrally connected to the second cable. At this time, the engagement projection is retained in the terminal end portion of the reception groove while it guided by the axially extended portion of the insertion groove. As a result, the cables can be maintained in an axial connection condition in which the connection end portions thereof are securely integrally connected. In the axial connection condition of the cables, the second cable can be further axially inserted. Thus, the connection end portions of the cables, when axially coupled to each other, can be axially securely connected to each other, so as to not be disengaged from each other.

Further, the present invention may have constructed as follows. That is, one end portion of the spring member engages the first cable and the other end portion of the spring member engages the insertion groove formed in the connection member while being screwed, so that the connection end portion of the first cable can be rotationally biased in one circumferential direction. Further, a guide is formed in a reception side end of the connection member through which the first cable is axially inserted. The guide engages the other end portion of the spring member with the insertion motion of the first cable and guides the other end portion of the spring member such that the other end portion of the spring member can be moved toward the insertion groove while being screwed in the other circumferential direction.

According to this structure, upon insertion of the connection end portion of the first cable into the cylindrical connection member, the other end portion of the spring member is guided by the guide so as to engage the insertion groove while being screwed. Therefore, the connection end portion of the first cable can be retained in the connection member by simply performing an insertion operation of the connection end portion of the first cable into the connection member without screwing the spring member. As a result, an axial coupling operation of the connection end portions of the cables can be easily and stably performed.

BEST MODE FOR CARRYING OUT THE INVENTION

In the following, the best mode for carrying out the present invention is described with reference to the drawings.

Embodiment 1

Figure 1:
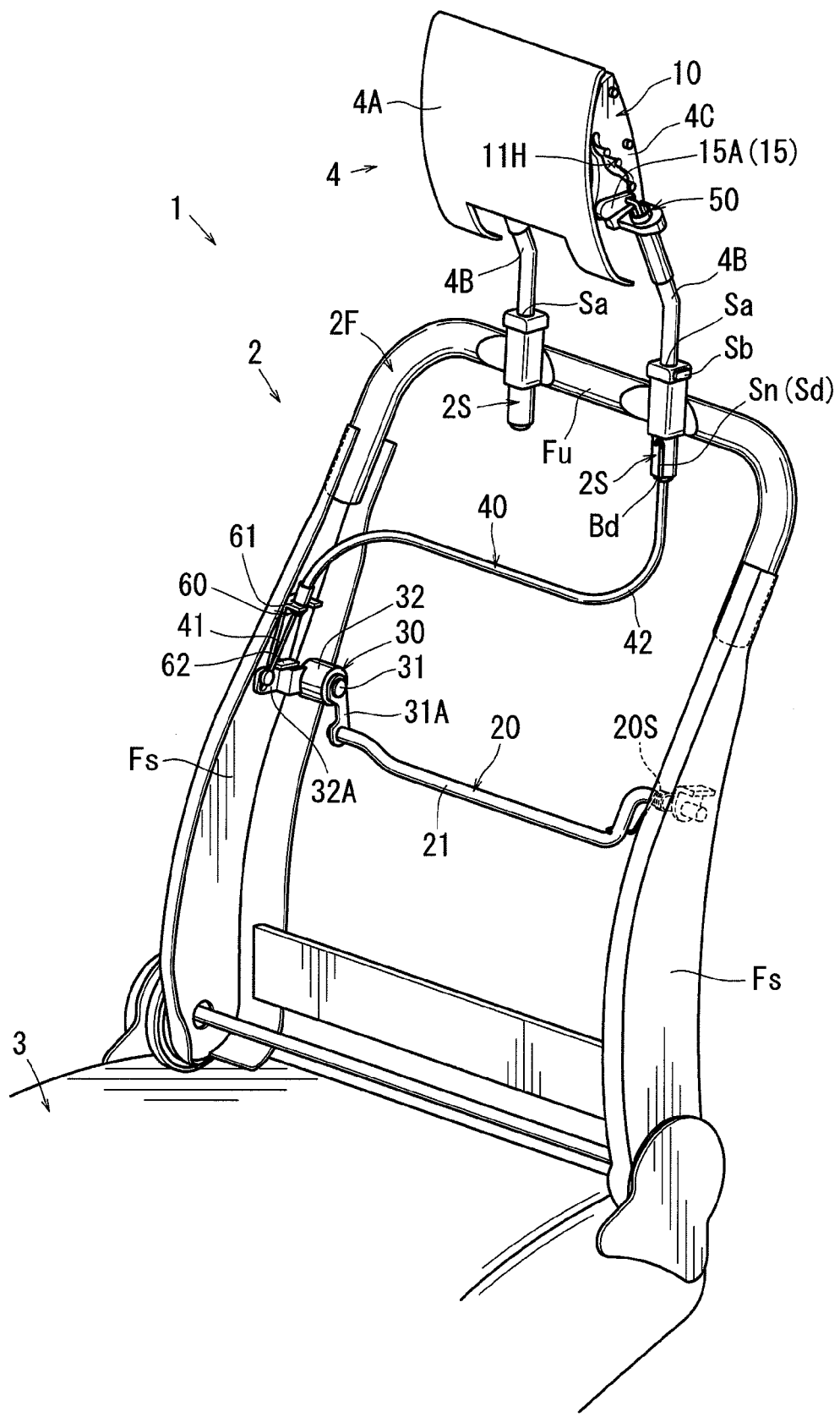
FIG. 1 is a perspective view of a vehicle seat according to Embodiment 1, which schematically illustrates construction thereof.

First, construction of a cable connection structure according to Embodiment 1 is described with reference to FIGS. 1 to 17. As shown in FIG. 1, the cable connection structure of this embodiment is constructed to connect two cables disposed within a vehicle seat 1 to each other. FIG. 1 is a perspective view of the vehicle seat 1, which schematically illustrates construction thereof. The vehicle seat 1 is composed of a seat back 2 that functions as a back support of a sitting person, a seat cushion 3 that functions as a seating portion, and a headrest 4 that functions as a head support.

In the drawings such as FIG. 1, in order to clarify inner structure of the seat back 2, the headrest 4 and other components, covering structure thereof is omitted. The headrest 4 has two tubular stays 4B and 4B that are vertically attached to a lower portion thereof. The stays 4B and 4B are respectively inserted into insertion ports Sa formed in cylindrical supports 2S and 2S that are attached to an upper surface portion of the seat back 2, so that the headrest 4 is attached to the upper surface portion of the seat back 2.

The supports 2S and 2S are integrally secured to an upper frame Fu. The upper frame Fu forms an upper arm portion of a back frame 2F that constitutes a framework of the seat back 2. The upper frame Fu is integrally rigidly connected to both of side frames Fs and Fs that constitute the back frame 2F while connecting upper end portions of the side frames Fs and Fs. The headrest 4 is normally retained in its predetermined position, so as to catch the head of the sitting person at a rear side position thereof.

However, the headrest 4 is constructed such that when a vehicle back-side collision happens, a support portion 4A can instantaneously move forwardly, so as to move closer to the head. The support portion 4A is positioned at a front side of the headrest 4 and is constructed to catch the head. That is, the headrest 4 is constructed such that when the vehicle back-side collision, only the support portion 4A of the headrest 4 can move to a position immediately behind the back of the head of the sitting person that has a posture in which the body is forwardly spaced from the seat back 2 and the headrest 4. Thus, when the vehicle back-side collision happens, rearward inclination of the head can be quickly stopped. As a result, a loading applied to the neck can be reduced, so that a whiplash injury can be prevented.

Figure 11:
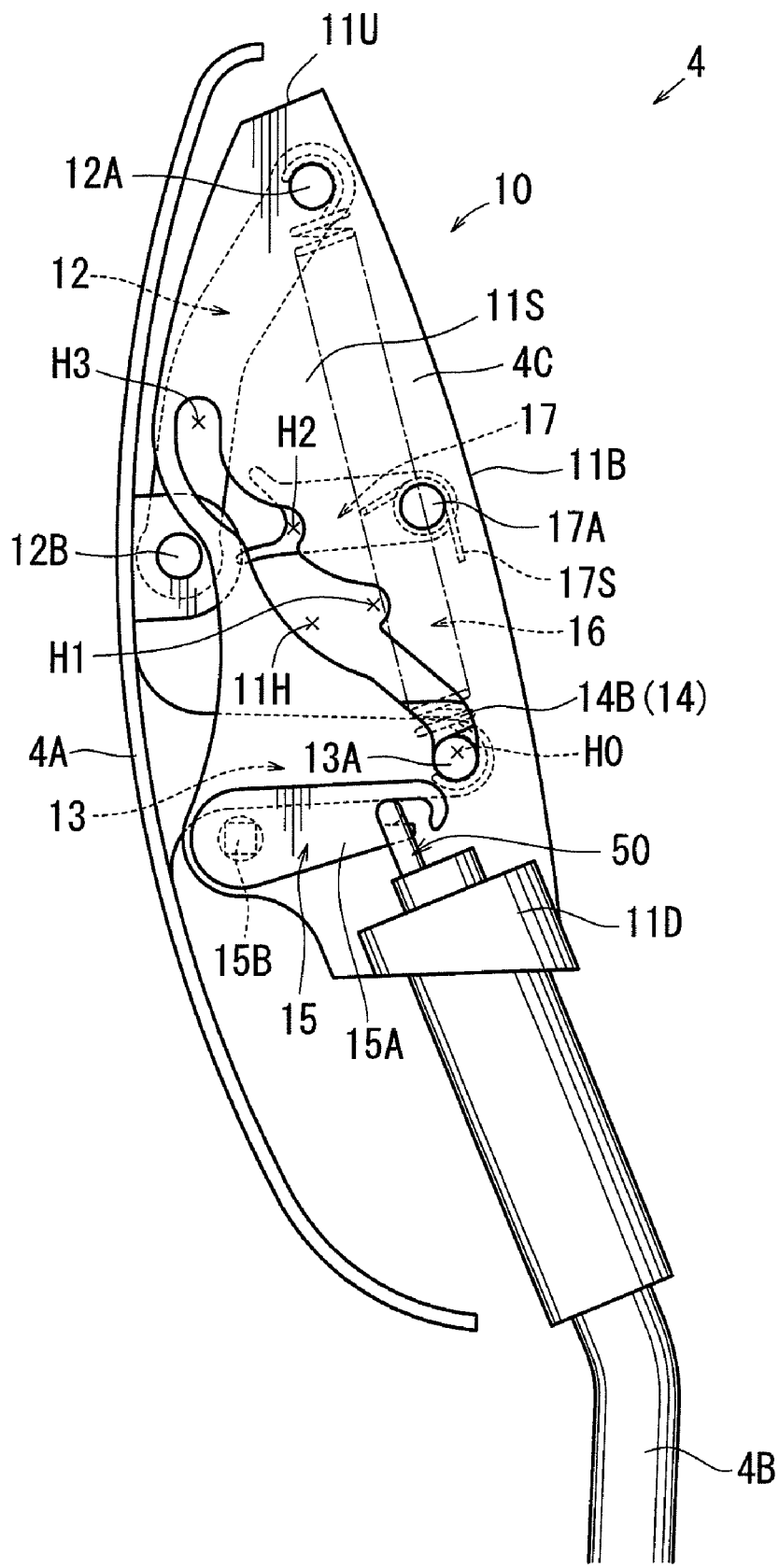
FIG. 11 is a side view, which illustrates a condition in which a support portion of the headrest is retained in an initial position.

Motion to move the support portion 4A forwardly when the vehicle back-side collision happens can be performed by a headrest moving mechanism 10 that is incorporated into the headrest 4. As shown in FIG. 11, in a normal condition in which the vehicle back-side collision does not yet happen, the headrest moving mechanism 10 retains the support portion 4A in a posture of an initial position thereof while maintaining the support portion 4A in a forward movement restraint condition. Further, the support portion 4A is normally biased forwardly, i.e., in a direction toward the head, by a tension spring 16 that is positioned between the support portion 4A and a headrest base portion 4C integrated with the stays 4B and 4B.

Figure 14:
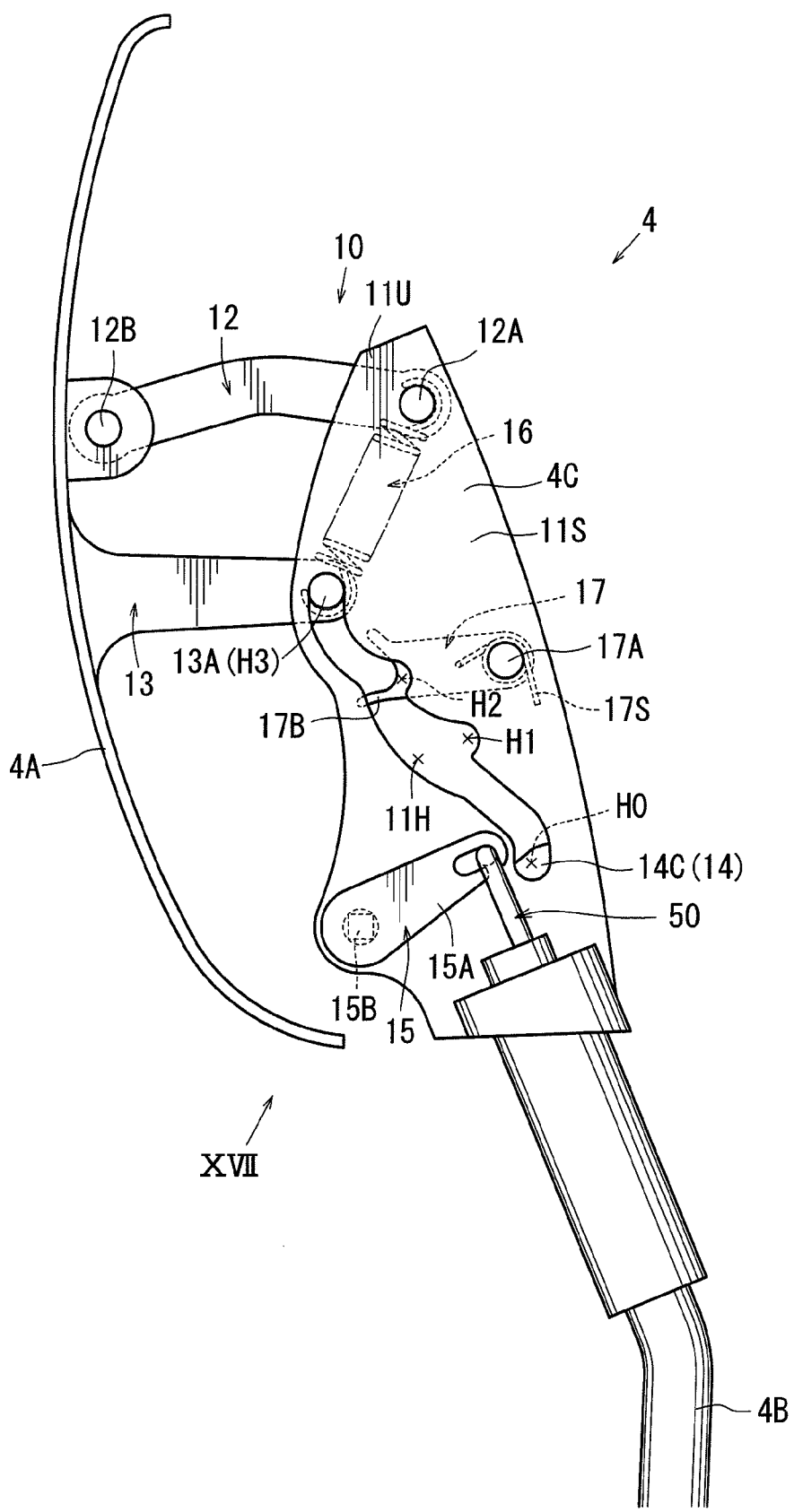
FIG. 14 is a side view, which illustrates a condition in which the support portion of the headrest reaches a position closer to the head.

However, in the normal condition in which the vehicle back-side collision does not yet happen, the support portion 4A is retained in the initial position against a biasing force of the tension spring 16. When the vehicle back-side collision happens and the movement restraint condition of the support portion 4A is canceled, the headrest moving mechanism 10 can move the support portion 4A forwardly by the biasing force of the tension spring 16. In particular, the headrest moving mechanism 10 can move the support portion 4A forwardly and upwardly along profiles of elongated holes 11H and 11H formed in the headrest base portion 4C which will be described hereinafter. As a result, as shown in FIG. 14, the support portion 4A is moved to the position immediately behind the back of the head (a collision preparatory position).

The headrest moving mechanism 10 is constructed such that in the condition in which the support portion 4A is moved to the collision preparatory position, the support portion 4A cannot be pushed back even if the support portion 4A is applied with a loading caused by the rearward inclination of the head when the vehicle back-side collision happens. As a result, the head of the sitting person can be stably caught by the support portion 4A that is retained in the collision preparatory position.

Figure 2:
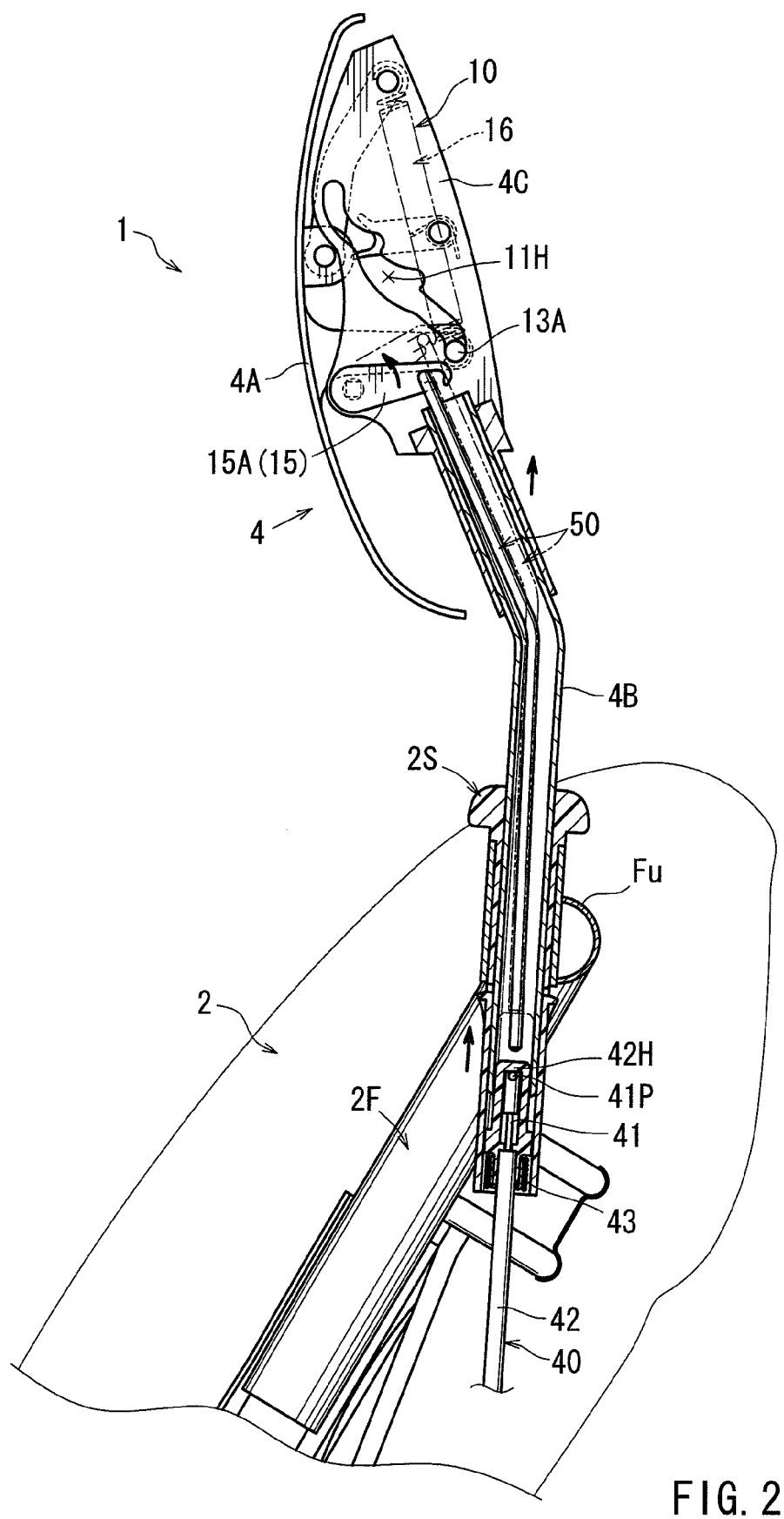
FIG. 2 is a structural diagram, which illustrates a structure in which a push rod is pushed upwardly by an operation cable.

Referring to FIG. 1 again, an operation of canceling the movement restraint condition of the support portion 4A described above can be performed by a push up motion of a push rod 50. The push rod 50 is inserted into the right side tubular stay 4B of the headrest 4, as seen in the drawing. Further, a double layer cable structure constructed of the tubular stay 4B and the push rod 50 described above corresponds to a second cable in the present invention. As shown in FIG. 2, an upper end portion of the push rod 50 is connected to an engagement-disengagement member 15 that is provided as an operation member of the headrest moving mechanism 10.

Figure 4:
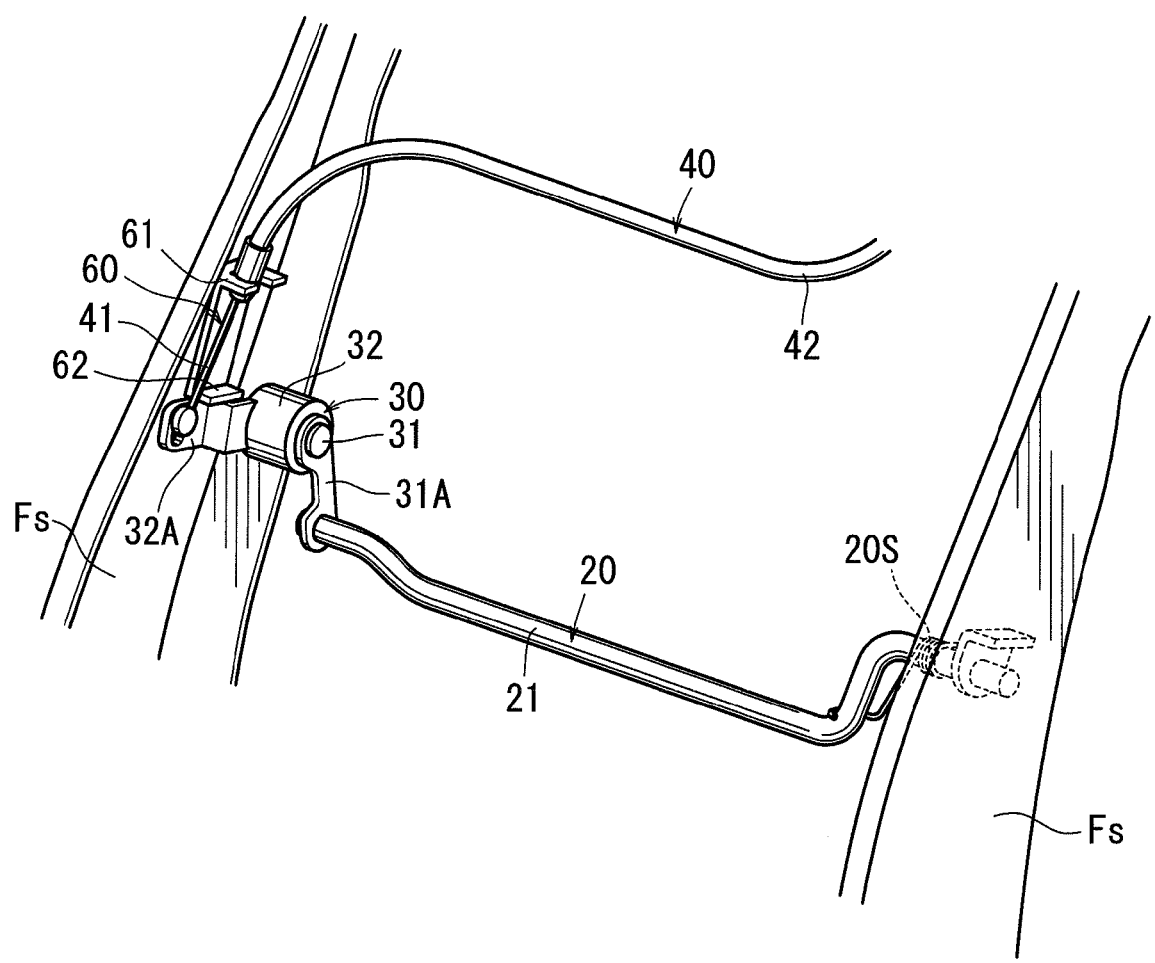
FIG. 4 is an enlarged perspective view of a detection device that can detect a vehicle back-side collision.

A lower end portion of the push rod 50 is connected to an upper end portion of an operation cable 40 that is disposed inside the seat back 2. Further, the operation cable 40 corresponds to a first cable in the present invention. As shown in FIG. 4, a lower end portion of the operation cable 40 is connected to a pressure receiving member 20 that is disposed in the seat back 2, so that the operation cable 40 can be pulled downwardly when the vehicle back-side collision happens. The pressure receiving member 20 may function as a detection device of the vehicle back-side collision.

Further, referring to FIG. 2 again, the operation cable 40 is constructed such that when its lower end portion is pulled, a corresponding operational force is reversed and transmitted to its upper end portion as a push operational force, thereby pushing the push rod 50 up. Further, when the push rod 50 is pushed up, the engagement-disengagement member 15 is pushed and rotated counterclockwise as seen in the drawing, so that the movement restraint condition of the support portion 4A can be canceled.

In the following, construction of the above-mentioned back-side collision detection device for pushing the above-mentioned push rod 50 up when the vehicle back-side collision happens is described. As shown in FIG. 4, the bent rod-shaped pressure receiving member 20 is disposed in the seat back 2 so as to be positioned in a middle portion thereof. The pressure receiving member 20 is positioned so as to extend in a width direction. A right end portion of the pressure receiving member 20 is rotatably supported on a right side frame Fs of the seat back 2. Further, a left end portion of the pressure receiving member 20 is rotatably supported on a left side frame Fs via a rotary type damper 30.

Formed in a widthwise middle portion of the pressure receiving member 20 is a pressure receiving portion 21 that capable of receiving a seat back loading applied by the sitting person. The pressure receiving portion 21 is formed by bending the right end portion of the pressure receiving member 20 downwardly as seen in the drawing, so as to be offset from a rotation center thereof. Thus, when the pressure receiving portion 21 is pressed rearwardly by the seat back loading applied by the sitting person, the pressure receiving member 20 can be rotated about the both end portions thereof.

Further, a torsion spring 20S is disposed between the right end portion of the pressure receiving member 20 and the right side frame Fs. The torsion spring 20S is disposed while it is previously twisted, thereby rotationally biasing the pressure receiving member 20 in such a direction as to push the pressure receiving portion 21 forwardly. As a result, the pressure receiving member 20 is normally maintained in a postural condition in which the pressure receiving portion 21 is pressed against a cushion pad (not shown) that is attached to a seat back surface of the seat back 2.

Further, a well-known rotary type damper is used as the damper 30 that is connected to the left end portion of the pressure receiving member 20. That is, in the damper 30, a rotation shaft 31 is inserted into a cylindrical case 32. The rotation shaft 31 and the case 32 are assembled so as to be rotated relative to each other. The rotation shaft 31 has a connection arm 31A that is attached to a right end portion thereof. The connection arm 31A is integrally connected to the left end portion of the pressure receiving member 20.

Further, a left end portion of the rotation shaft 31 as seen in the drawing is rotatably supported by the left side frame Fs. Thus, the case 32 is supported by the rotation shaft 31, so as to be rotatable with respect to the side frame Fs. Further, the case 32 has an operation arm 32A that is attached to an outer circumferential surface thereof. The operation arm 32A is connected to a lower end portion of an inner cable 41 of the operation cable 40 which will be described hereinafter.

The case 32 is constructed such that when the operation arm 32A contacts a stopper 62 of an attachment bracket 60 that is attached to the side frame Fs, its movement in such a direction as to contact the stopper 62 can be restrained. The case 32 described above is filled with a viscous fluid such as silicone oil and is hermetically sealed. As a result, when the rotation shaft 31 is urged to rotate relative to the case 32, a viscous resistance is produced therebetween dependent upon a rotating speed thereof.

This viscous resistance is applied between the rotation shaft 31 and the case 32. The viscous resistance is increased as the rotating speed of the rotation shaft 31 is increased. Conversely, the viscous resistance is decreased as the rotating speed of the rotation shaft 31 is decreased. When the applied viscous resistance is large, a rotational force of the rotation shaft 31 can be easily transmitted to the case 32. Conversely, when the applied viscous resistance is small, the rotational force of the rotation shaft 31 cannot be not easily transmitted to the case 32. Therefore, when the sitting person reclines against the seat back 2, the pressure receiving member 20 and the damper 30 thus constructed may operate as follows.

First, in the normal condition in which the vehicle back-side collision does not yet happen, when the sitting person reclines against the seat back 2, the pressure receiving member 20 is pushed and rotated rearwardly at a relatively gentle speed corresponding to behavior of the sitting person. Therefore, in this case, the rotation shaft 31 can rotate relative to the case 32 at a relatively gentle speed, so that the applied viscous resistance is small. As a result, the rotation shaft 31 idles within the case 32, so that the rotational force of the rotation shaft 31 can not be transmitted to the case 32.

However, when the vehicle back-side collision happens, the sitting person is sharply pressed against the seat back 2 by impact of the collision. At this time, the pressure receiving member 20 is pushed and rotated rearwardly at a relatively high speed corresponding to impulsive motion of the setting person. Therefore, in this case, the rotation shaft 31 can relatively rotate at a relatively high speed, so that the applied viscous resistance is large. As a result, the rotational force of the rotation shaft 31 can be transmitted to the case 32, so that the case 32 can rotate integrally with the rotation shaft 31. Thus, the case 32 can pull the lower end portion of the inner cable 41 downwardly because the lower end portion of the inner cable 41 is connected to the operation arm 32A.

Further, when the lower end portion of the inner cable 41 is pulled, as shown in FIG. 2, the corresponding operational force is transmitted to an upper end portion of the inner cable 41, so that the push rod 50 is pushed up within the support 2S.

Next, a transmission mechanism of the operational force transmitted from the operation cable 40 to the push rod 50 is described. The operation cable 40 has a double layer structure in which the linear inner cable 41 is inserted into a flexible tubular outer cable 42. The inner cable 41 has flexibility greater than the outer cable 42. As shown in FIG. 4, the operation cable 40 is disposed inside the seat back 2, and the lower end portion of the inner cable 41 is connected to the operation arm 32A of the damper 30 described above.

Figure 3:
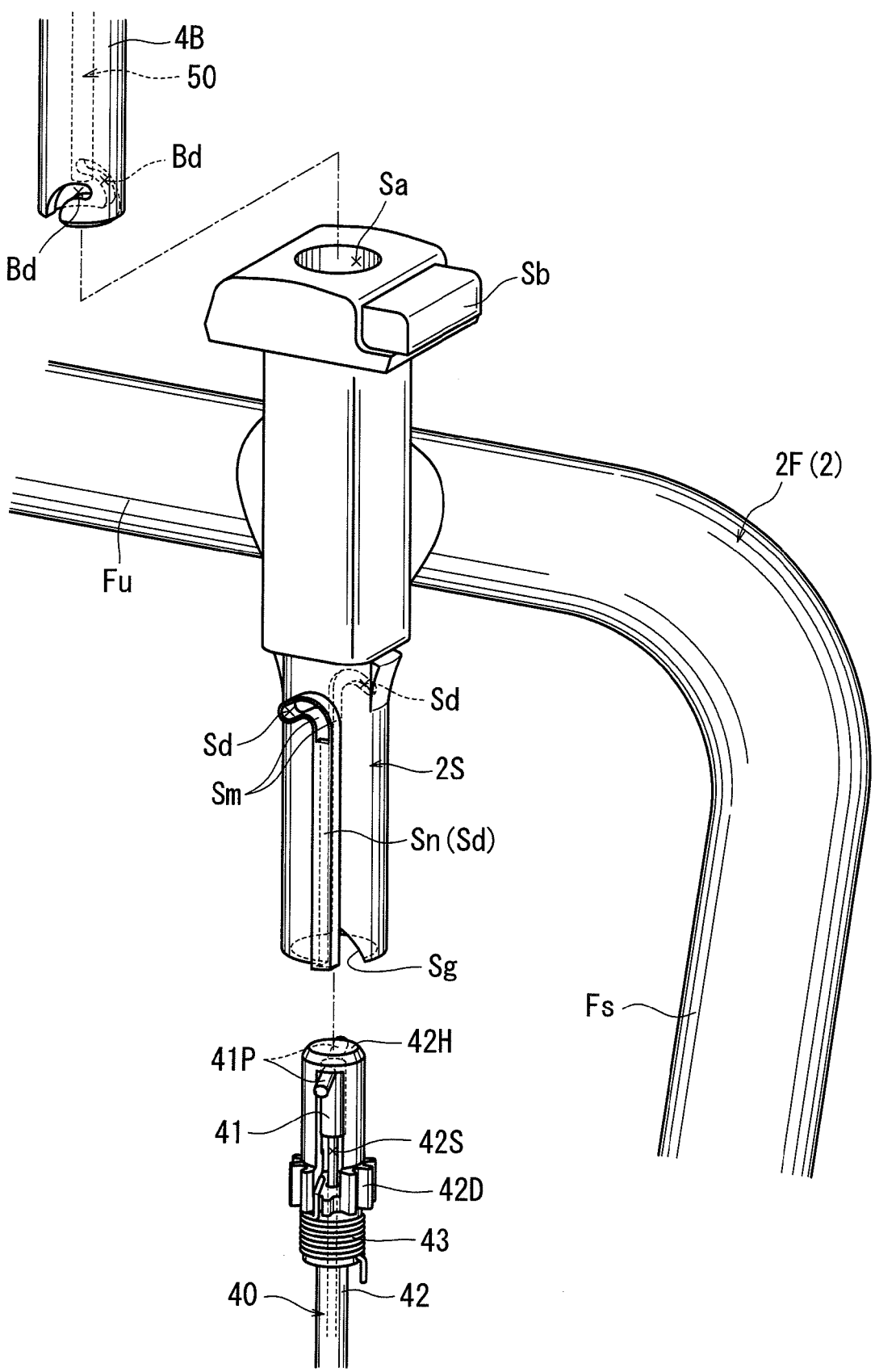
FIG. 3 is an enlarged perspective view, which illustrates an insertion structure in which a stay of a headrest and the operation cable are inserted into a cylindrical support.

Further, a lower end portion of the outer cable 42 is connected to an outer attaching portion 61 of the attachment bracket 60 that is attached to the left side frame Fs as seen in the drawing. Thus, the operation cable 40 is constructed such that the lower end portion of the inner cable 41 is pulled from the lower end portion of the outer cable 42 when the vehicle back-side collision happens. As shown in FIGS. 2 and 3, upon insertion of the upper end portion of the operation cable 40 into the support 2S from below, the operation cable 40 can be assembled to the support 2S so as to push the push rod 50 disposed in the tubular stay 4B that is inserted into the cylindrical support 2S later.

In particular, as shown in FIG. 3, the operation cable 40 is constructed such that T-shaped engagement projections 41P and 41P formed in the upper end portion of the inner cable 41 are projected radially outwardly from elongated through holes 42S and 42S that are formed in a circumferential wall of the upper end of the outer cable 42. As a result, the inner cable 41 can axially move relative to the outer cable 42 within a range corresponding to a range that the engagement projections 41P and 41P can move within the elongated holes 42S and 42S.

Figure 5:
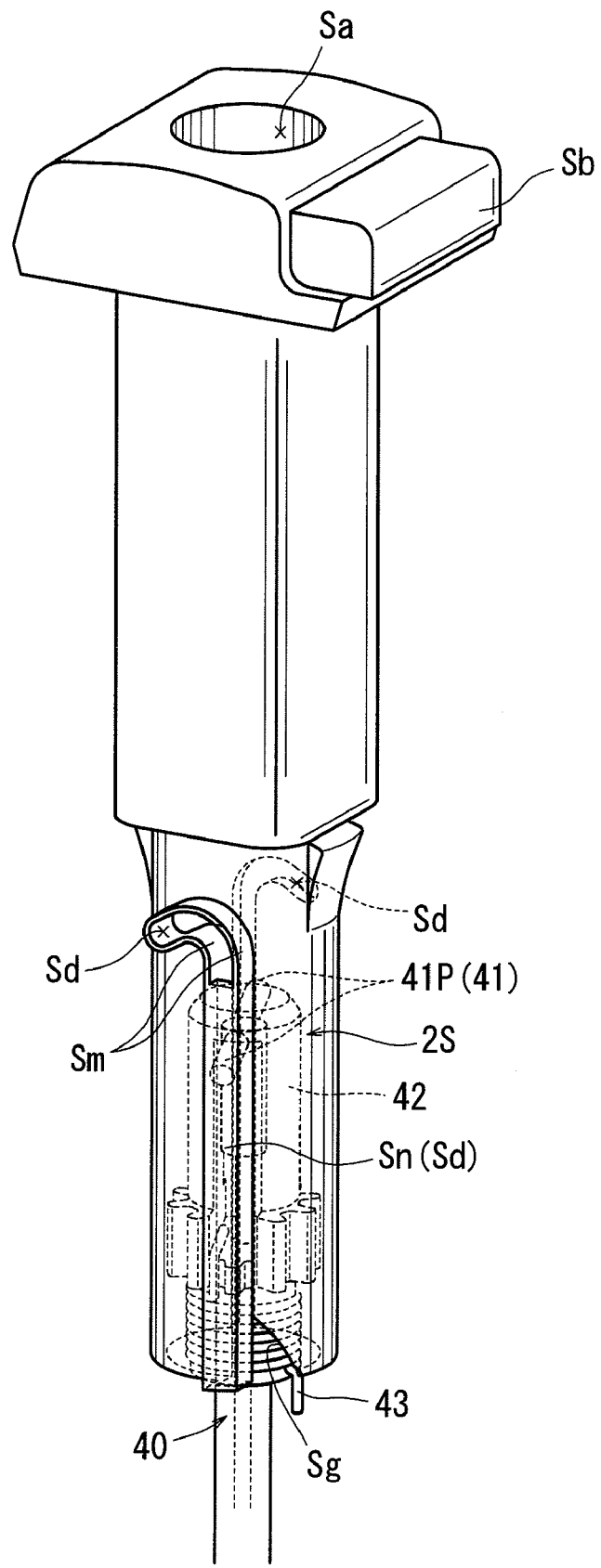
FIG. 5 is a perspective view, which illustrates a condition in which the operation cable are inserted into the cylindrical support and an end portion of a coil spring contacts a slanted guide surface.
Figure 6:
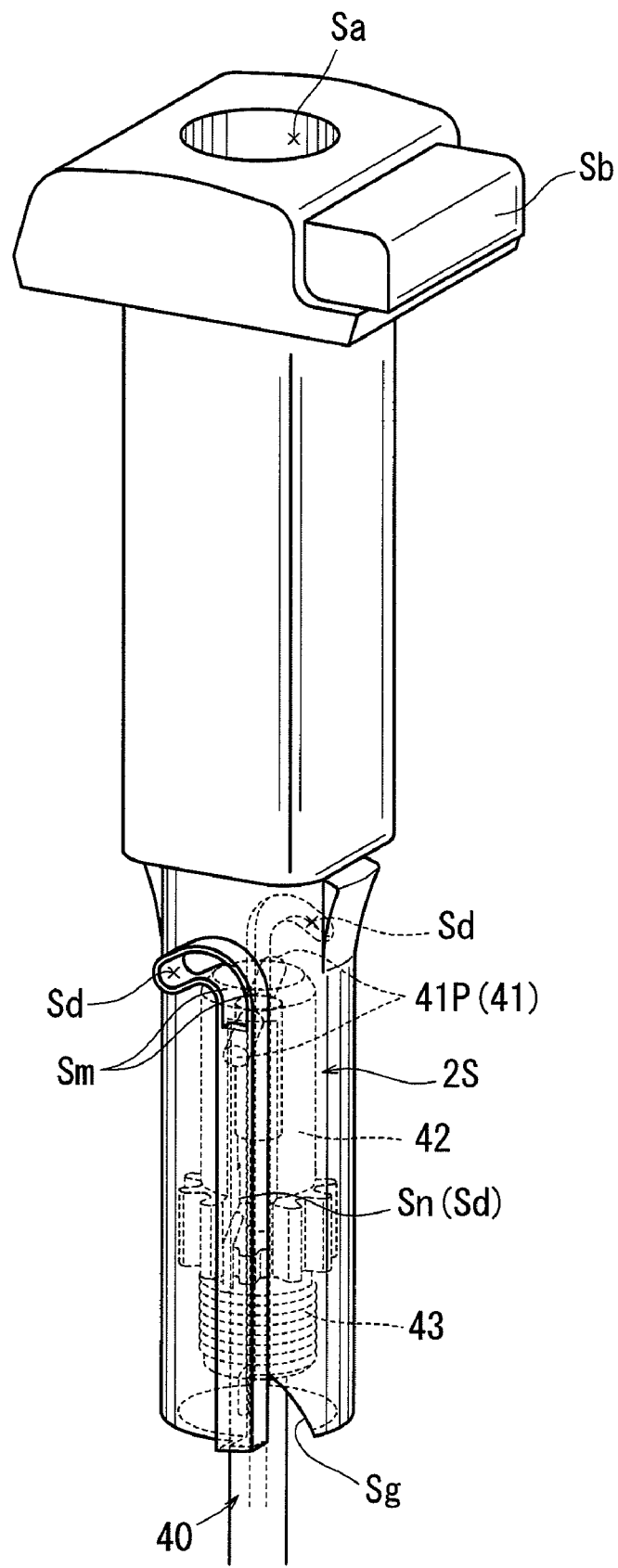
FIG. 6 is a perspective view, which illustrates a condition in which the operation cable are inserted into the cylindrical support and the end portion of the coil spring engages an insertion groove while being twisted.
Figure 7:
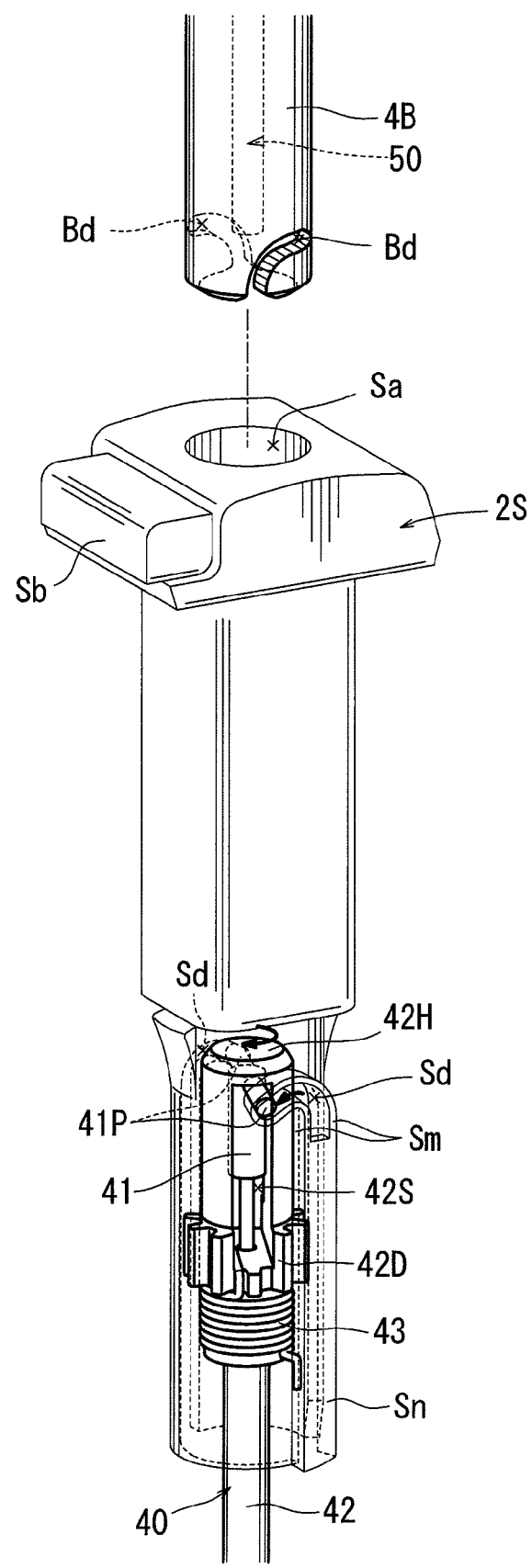
FIG. 7 is a perspective view, which illustrates a condition before the stay is inserted into the cylindrical support.

The engagement projections 41P and 41P and the elongated holes 42S and 42S are axisymmetrically formed in two circumferential positions of the inner cable 41 and the outer cable 42. A head portion 42H is formed in an upper end portion of the outer cable 42, so as to close a tubular end portion thereof. As shown in FIGS. 5 to 7, when the upper end portion of the operation cable 40 thus constructed is inserted into the cylindrical the support 2S from below, the operation cable 40 is temporarily retained while the upper end portion thereof is suspended from the support 2S.

Figure 8:
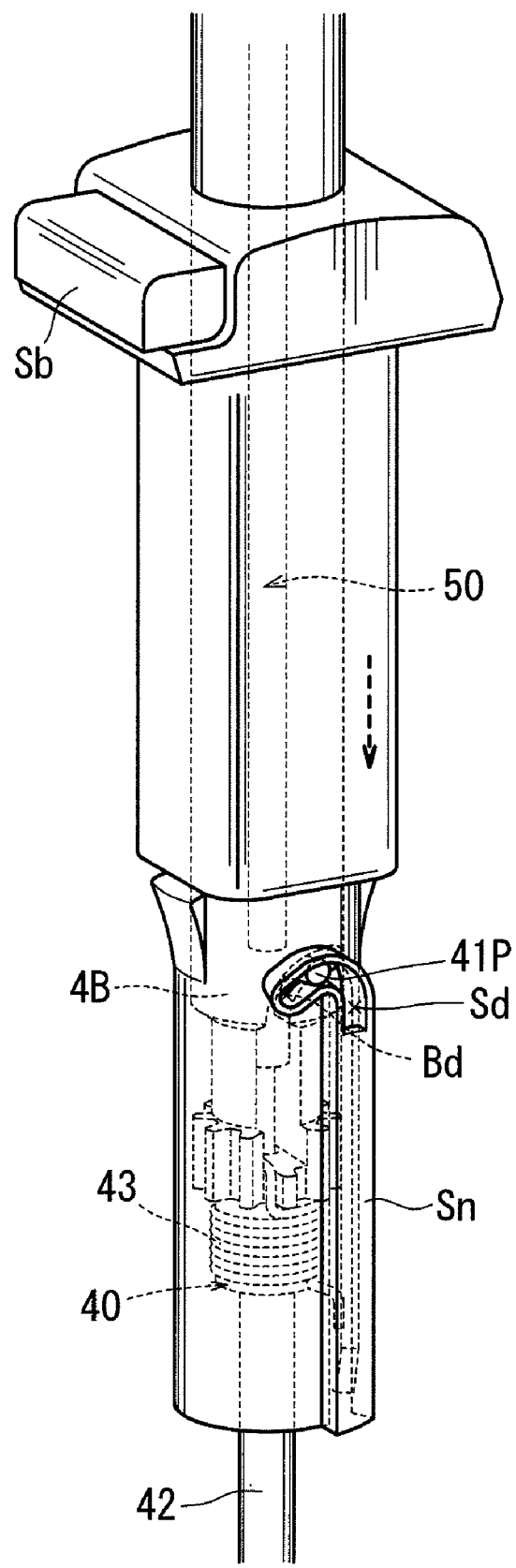
FIG. 8 is a perspective view, which illustrates a condition in which the stay is being inserted into the cylindrical support.
Figure 9:
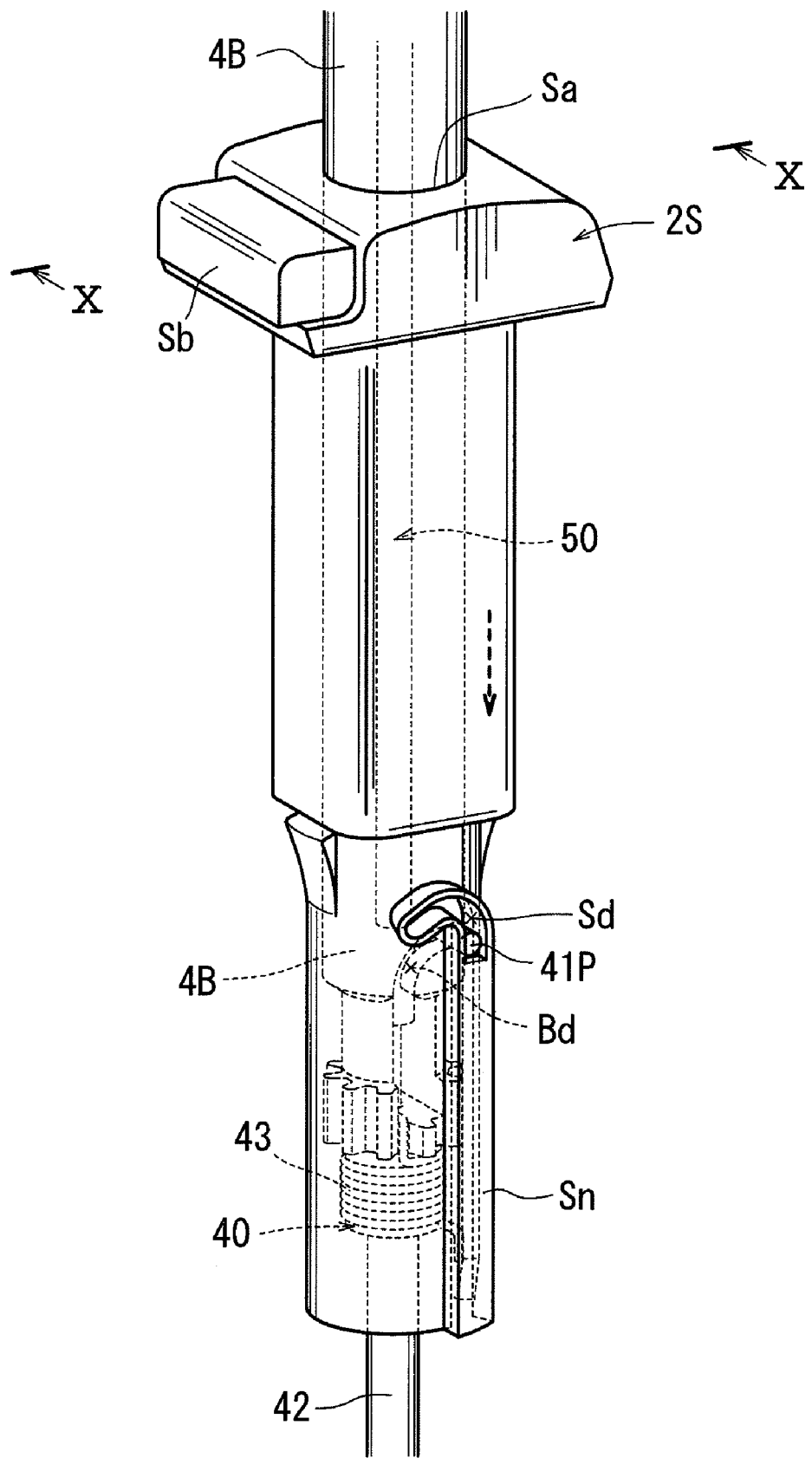
FIG. 9 is a perspective view, which illustrates a condition in which the stay is inserted into the cylindrical support, so that cables are axially connected to each other.

In this suspended condition (FIG. 7), as shown in FIGS. 8-9, upon insertion of the stay 4B into the cylindrical support 2S from above, the operation cable 40 can be transferred from a condition in which the operation cable 40 is suspended from the support 2S to a condition in which the operation cable 40 is suspended from the stay 4B. Further, when the operation cable 40 is in the condition in which it is suspended from the stay 4B, the operation cable 40 is in a condition in which the operation cable 40 can reverse and transmit the operational force produced from the lower end thereof being pulled to the push rod 50 positioned inside the stay 4B as a push operational force.

The construction described above is described in detail with reference to FIG. 3. First, formed in a circumferential wall of the support 2S are slot-shaped insertion grooves Sd and Sd that extend axially upwardly from a lower end portion of the support 2S. The insertion grooves Sd and Sd are positioned in two circumferential positions of the support 2S so as to be axisymmetrical with each other. The insertion grooves Sd and Sd are respectively shaped such that the engagement projections 41P and 41P formed in the inner cable 41 can be received therein and can be moved therealong in an axial direction.

The insertion grooves Sd and Sd are respectively shaped such that terminal end portions corresponding to upper end sides thereof that receive the engagement projections 41P and 41P are respectively circumferentially curved leftwardly and rightwardly as seen in the drawings. In particular, the insertion groove Sd positioned in a near side in FIG. 3 and shown by solid lines is shaped such that the terminal end portion thereof is curved leftwardly as seen in the drawing. Conversely, the insertion groove Sd positioned in a far side in FIG. 3 and shown by broken lines is shaped such that the terminal end portion thereof is curved rightwardly as seen in the drawing. Further, the insertion grooves Sd and Sd are shaped so as to be axisymmetrical with each other.

Each of the circumferentially curved terminal end portions of the insertion grooves Sd and Sd is shaped so as to be positioned below a horizontal level line. As a result, the engagement projections 41P and 41P (the operation cable 40), when inserted into the insertion grooves Sd and Sd until they reach terminal end positions thereof, are stably retained while they are suspended from the support 2S, so as to be prevented from falling therefrom under their own weight.

The support 2S is formed by integral molding of polypropylene (PP) resin. The support 2S thus formed includes outwardly projected projection walls Sm and Sm that are formed in an outer circumferential surface thereof. The projection walls Sm and Sm respectively extend along peripheries of each of the insertion grooves Sd and Sd. Thus, the peripheries of each of the insertion grooves Sd and Sd are partially thickened, so that the support 2S can have an increased cross-sectional strength. Further, the insertion grooves Sd and Sd are respectively covered by covering walls Sn and Sn that are respectively connected to the projection walls Sm and Sm.

Thus, the support 2S has a closed transverse cross-sectional shape in transverse cross section. As a result, the support 2S can be cross-sectionally reinforced. The operation cable 40 can be inserted into the cylindrical support 2S by simply inserting the same axially while the engagement projections 41P and 41P attached to the upper end portion of the inner cable 41 are inserted into the insertion grooves Sd and Sd.

Further, a coil spring 43 is attached to the outer cable 42. The coil spring 43 corresponds to a spring member in the present invention. An upper end portion of the coil spring 43 is inserted into the elongated hole 42S, so as to be attached to the outer cable 42. Conversely, a lower end portion of the coil spring 43 is not attached to any component and is maintained in a free condition. Further, the lower end portion of the coil spring 43 is bent so as to be projected radially from a main portion of the coil spring 43.

As shown in FIG. 5, upon insertion of the upper end portion of the operation cable 40 into the support 2S, the lower end portion, i.e., a free end, of the coil spring 43 contacts (engages) an inclined surface-shaped guide Sg that is formed in the support 2S by removing a lower end thereof. Further, as shown in FIGS. 5 and 6, the guide Sg has an inclined surface that is capable of guiding the engaged lower end portion of the coil spring 43 with the insertion motion of the operation cable 40 such that the lower end portion of the coil spring 43 can be moved toward the insertion groove Sd while it is screwed circumferentially.

Therefore, upon insertion of the upper end portion of the operation cable 40 into the support 2S, the lower end portion of the coil spring 43 is guided by the guide Sg and enters the insertion groove Sd while it is screwed leftward as seen in the drawing, so as to engage the insertion groove Sd. Thus, as shown in FIG. 6, the operation cable 40 inserted into the support 2S can be applied with a biasing force in a rotational direction in which the lower end portion of the coil spring 43 is screwed.

However, at this time, because the engagement projections 41P and 41P engage the insertion grooves Sd and Sd, the operation cable 40 can be maintained in a condition in which it is prevented from being rotated circumferentially by the biasing force. Therefore, upon axial insertion of the operation cable 40, the engagement projections 41P and 41P are transferred to the terminal end positions of the insertion grooves Sd and Sd along circumferentially curved portions thereof via the biasing force of the coil spring 43.

After the engagement projections 41P and 41P reach the terminal end positions of the insertion grooves Sd and Sd, an insertion operation of the operation cable 40 is stopped. As a result, the engagement projections 41P and 41P are elastically retained in the terminal end positions of the insertion grooves Sd and Sd via the biasing force of the coil spring 43. Therefore, in this structure, in order to move the engagement projections 41P and 41P to the circumferentially curved terminal end positions of the insertion grooves Sd and Sd, it is not necessary to circumferentially rotate the operation cable 40. That is, the engagement projections 41P and 41P can be automatically transferred to the terminal end positions of the insertion grooves Sd and Sd via the biasing force of the coil spring 43 (FIG. 7).

When the engagement projections 41P and 41P reach the terminal end positions of the insertion grooves Sd and Sd, the engagement projections 41P and 41P can be elastically supported via the biasing force of the coil spring 43, so as to not be disengaged from the terminal end positions. Further, the coil spring 43 having the biasing force described above can be guided and screwed by the guide Sg by simply performing the insertion operation of the operation cable 40 into the support 2S.

Therefore, the operation cable 40 can be temporarily retained in the support 2S by simply performing the insertion operation of the operation cable 40 into the support 2S without screwing the coil spring 43. Further, the operation cable 40 is disposed inside the seat back 2 while it is partially bent, so as to not interfere with the pressure receiving member 20 or other such components.

Therefore, in a condition in which the operation cable 40 is inserted into the support 2S, the engagement projections 41P and 41P can be applied with a biasing force in a direction in which the engagement projections 41P and 41P are pulled back from the terminal end portions of the insertion grooves Sd and Sd. The biasing force can be produced by a restoring force of the operation cable 40 that is disposed in a distorted condition. Further, such a pulling back biasing force can be produced by vibratory motion of the vehicle seat 1 when the vehicle seat 1 is moved on a manufacturing line for assembly.

However, even if the engagement projections 41P and 41P are applied with such a pulling back biasing force, the engagement projections 41P and 41P can be retained in the terminal end positions of the insertion grooves Sd and Sd via the biasing force of the coil spring 43. Therefore, the operation cable 40 can be stably retained while it is suspended from the support 2S. Referring to FIG. 3 again, the upper end portion of the outer cable 42 is integrally formed from synthetic resin, so as to have a bulged portion 42D that is partially bulged radially outwardly. The bulged portion 42D is positioned at an axial mid point of the upper end portion of the outer cable 42 that is inserted into the cylindrical support 2S.

The bulged portion 42D is formed over the entire circumference thereof and has a serration shape. The bulged portion 42D is formed to have an outer diameter substantially equal to an inner diameter of the cylindrical support 2S. Therefore, because the bulged portion 42D can be gently fitted into the cylindrical support 2S when the upper end portion of the operation cable 40 is inserted into the cylindrical support 2S, the operation cable 40 can be smoothly inserted without swinging within the cylindrical support 2S.

Conversely, as shown in FIG. 7, slot-shaped reception grooves Bd and Bd are formed in a circumferential wall of the stay 4B that is inserted into the cylindrical support 2S from above. The reception grooves Bd and Bd are formed so as to extend axially upwardly from an lower end portion of the stay 4B. The reception grooves Bd and Bd are positioned in two circumferential positions of the stay 4B so as to be axisymmetrical with each other. When the stay 4B is inserted into the cylindrical support 2S from above, the reception grooves Bd and Bd may receive the engagement projections 41P and 41P of the inner cable 41 that is suspended in the cylindrical support 2S.

Further, when the stay 4B is further inserted into the support 2S after the engagement projections 41P and 41P are received in the reception grooves Bd and Bd, the engagement projections 41P and 41P are introduced upwardly (axially) along the reception grooves Bd and Bd. The reception grooves Bd and Bd that receive the engagement projections 41P and 41P are respectively shaped such that terminal end portions corresponding to upper end sides thereof are circumferentially curved in opposite directions to the insertion grooves Sd and Sd described above.

Each of the curved terminal end portions of the reception grooves Bd and Bd is shaped so as to be gently curved from an axial direction to a horizontal direction. As a result, when the stay 4B is inserted into the cylindrical support 2S, the engagement projections 41P and 41P positioned in the cylindrical support 2S can be smoothly received in the reception grooves Bd and Bd by only a push-in operational force axially applied to the stay 4B until they reach the terminal end positions of the reception grooves Bd and Bd that are directed horizontally.

Therefore, as shown in FIG. 8, when the stay 4B is inserted into the cylindrical support 2S from above, the engagement projections 41P and 41P are circumferentially rotated while they are guided by the curved portion of the reception grooves Bd and Bd formed in the stay 4B. As a result, the engagement projections 41P and 41P are pushed back from a condition in which the engagement projections 41P and 41P are retained in the terminal end positions of the insertion grooves Sd and Sd and are moved in such a direction as to be released from this condition.

When the engagement projections 41P and 41P move along the curved portions of the reception grooves Bd and Bd and reach the terminal end positions thereof, the engagement projections 41P and 41P are pushed back to axially extended portions of the insertion grooves Sd and Sd (FIG. 9). Thus, the engagement projections 41P and 41P are released from a condition in which their axial movement with respect to the support 2S is restrained, and are transferred to a condition in which they are suspended from the stay 4B (FIG. 9).

At this time, because the engagement projections 41P and 41P are positioned in the axially extended portions of the insertion grooves Sd and Sd, the engagement projections 41P and 41P are placed in a condition in which their circumferential movement with respect to the support 2S is restrained. As a result, the engagement projections 41P and 41P are retained in the terminal end positions of the reception grooves Bd and Bd. Thus, the stay 4B can be axially movable with respect to the support 2S while it is axially integrally connected to the inner cable 41.

Figure 10:
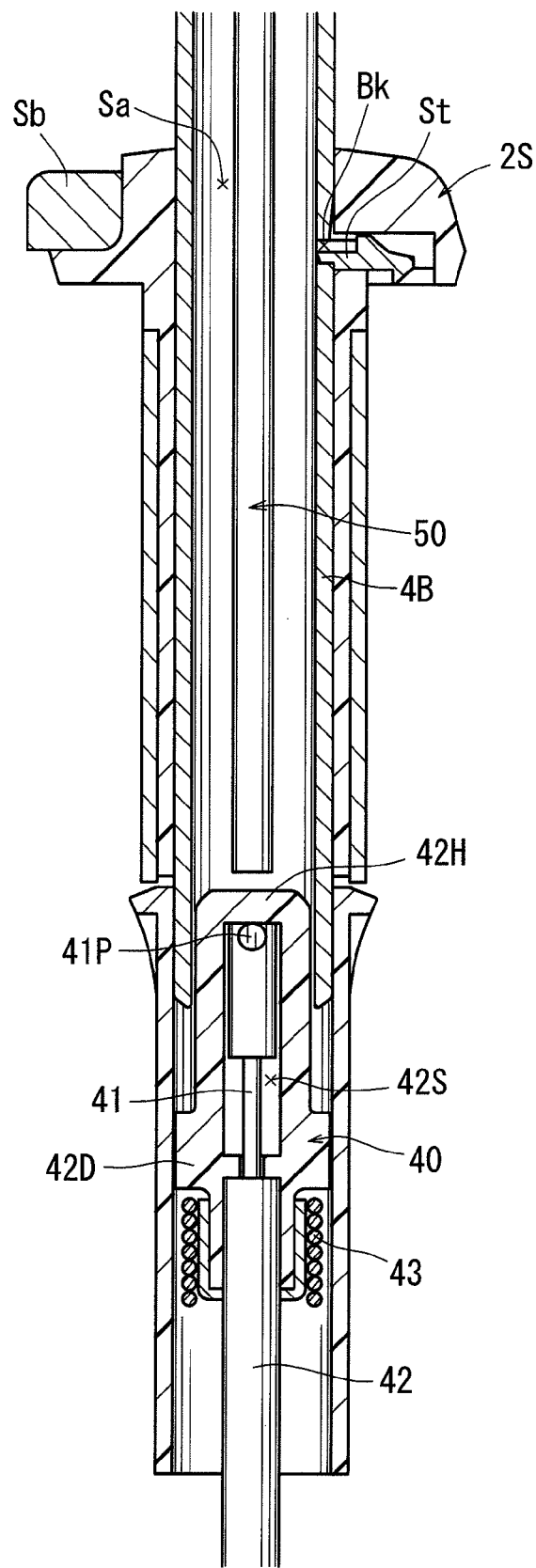
FIG. 10 is a sectional view taken along line X-X of FIG. 9.

As shown in FIG. 10, disposed in the insertion ports Sa of the cylindrical support 2S is a plate-shaped engagement claw St that is capable of engaging recess-shaped engagement grooves Bk that are formed in the outer circumferential wall of the stay 4B. The engagement claw St is normally applied with a biasing force and is maintained in a postural condition in which the engagement claw St is projected into the insertion ports Sa. However, the engagement claw St can be retracted from the insertion ports Sa by pushing a knob Sb from the side.

Thus, when a insertion position of one of the engagement grooves Bk is aligned with the engagement claw St upon insertion of the stay 4B into the insertion ports Sa, the engagement claw St enters and engages the corresponding engagement groove Bk by the biasing force. As a result, the stay 4B is placed in a condition in which the stay 4B is restrained from moving in an inserting direction. The condition in which the stay 4B is restrained from moving in the inserting direction can be canceled by disengaging the engagement claw St from the engagement groove Bk by pushing the knob Sb.

The engagement grooves Bk are formed in a plurality of positions in the axial direction of the stay 4B. Therefore, height of the headrest 4 can be freely adjusted by operating the knob Sb. Further, upon insertion of the stay 4B, the lower end portion of the stay 4B and the upper end portion of the inner cable 41 are axially connected to each other, thereby providing a condition in which the head portion 42H of the outer cable 42 is inserted into the cylindrical stay 4B from below.

As a result, as shown in FIG. 10, the head portion 42H of the outer cable 42 is axially positioned closer to the lower end portion of the push rod 50 that is inserted in the cylindrical stay 4B. Strictly speaking, a small gap is formed between the lower end portion of the push rod 50 and the head portion 42H such that the push rod 50 cannot be erroneously pushed by the head portion 42H of the outer cable 42 when the stay 4B is inserted.

Further, as previously described with reference to FIG. 2, in a condition in which the head portion 42H of the outer cable 42 and the lower end portion of the push rod 50 are axially positioned closer to each other, the operational force produced from the lower end of the operation cable 40 being pulled can be reversed and transmitted to the push rod 50 as the push operational force via the head portion 42H of the outer cable 42. Further, referring to FIG. 1 again, the above-described headrest 4 can be detached from the seat back 2 by pulling the stays 4B and 4B from the cylindrical the supports 2S and 2S.

At this time, as the stays 4B and 4B are drawn out, an axial connection condition of the inner cable 41 and the lower end portion of the stay 4B as described above is canceled. In particular, as will be recognized from FIG. 8, as the stay 4B is upwardly pulled from the support 2S, the engagement projections 41P and 41P are circumferentially rotated while they are guided by the curved portion of the insertion grooves Sd and Sd of the support 2S.

As a result, the engagement projections 41P and 41P are pushed back from a condition in which the engagement projections 41P and 41P are retained in the terminal end positions of the reception grooves Bd and Bd and are moved in such a direction as to be removed from this condition. When the engagement projections 41P and 41P move along the curved portions of the insertion grooves Sd and Sd and reach the terminal end positions thereof, the engagement projections 41P and 41P are pushed back to axially extended portions of the reception grooves Bd and Bd. As a result, as shown in FIG. 7, the engagement projections 41P and 41P are transferred again from the condition in which they are suspended from the stay 4B to the condition in which they are suspended from the support 2S. Thus, the axial connection condition of the head portion 42H of the outer cable 42 and the push rod 50 in which they are positioned closer to each other can be canceled.

Next, the headrest moving mechanism 10 is described. While construction of the headrest moving mechanism 10 is shown in FIGS. 11 to 17, the construction is best shown in FIG. 14. Therefore, the construction is described with reference to this drawing. The headrest moving mechanism 10 is arranged such that the support portion 4A is movably connected to the headrest base portion 4C. The headrest moving mechanism 10 includes a pair of connection links 12 and 12 that are laterally positioned, support members 13 and 13, hooks 14 and 14, an engagement-disengagement member 15, the tension spring 16 and lever members 17 and 17.

The headrest base portion 4C is made of synthetic resin. The headrest base portion 4C has a plate-shaped rear surface portion 11B, a bottom surface portion 11D, side surface portions 11S and 11S and a top surface portion 11U that are integrally formed. In particular, the bottom surface portion 11D extends forwardly from a lower end edge of the rear surface portion 11B. Further, the side surface portions 11S and 11S are vertically positioned on widthwise both sides of the headrest base portion 4C. Further, the top surface portion 11U connects upper edges of the side surface portions 11S and 11S.

Figure 17:
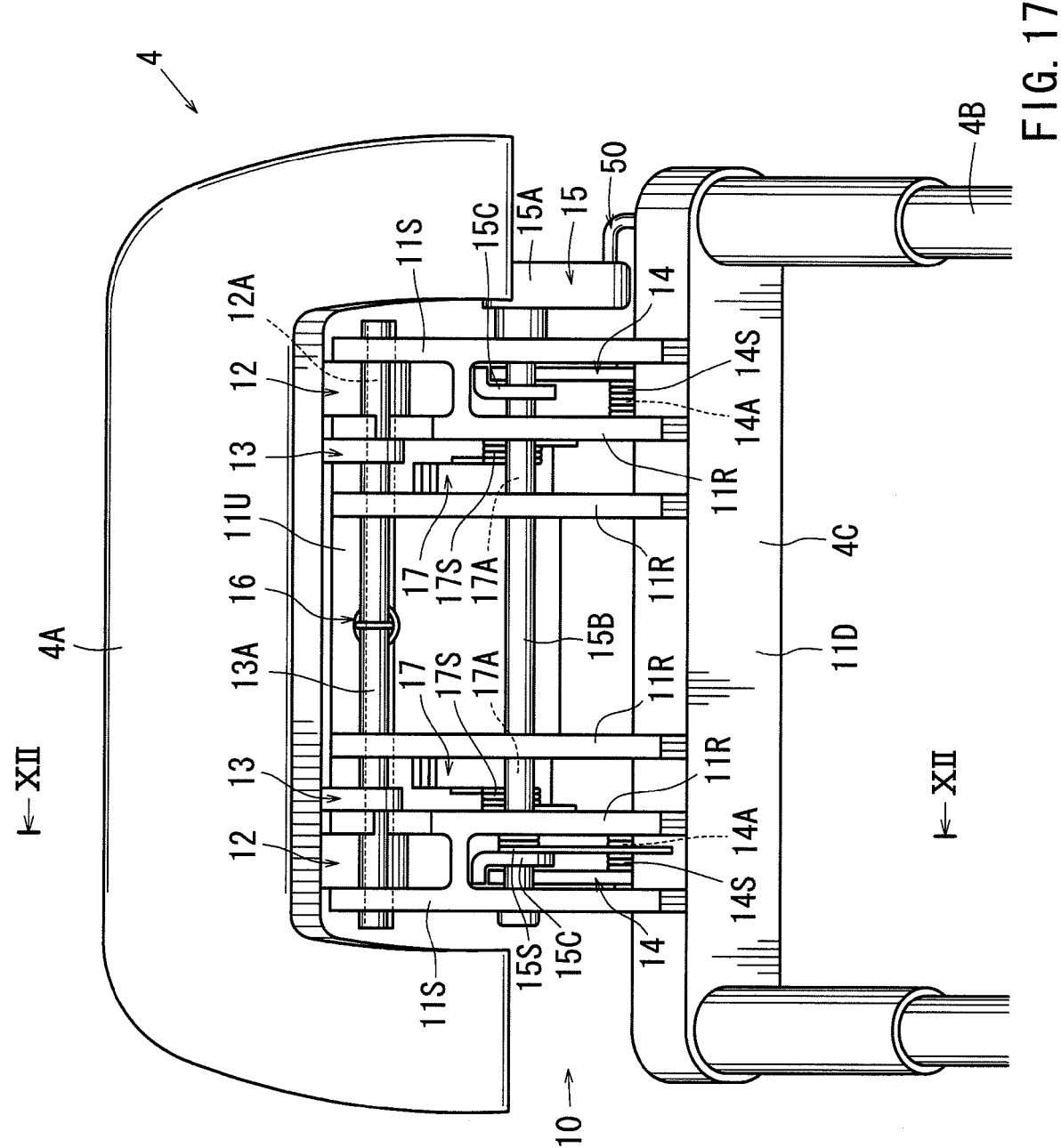
FIG. 17 is a structural diagram of the headrest moving mechanism, which is viewed from line XVII of FIG. 14.

FIG. 17 is a view that is viewed from line XVII of FIG. 14, that is, a front view of the headrest 4 that is viewed from obliquely below. As shown in the drawing, a plurality of upright plate-shaped ribs 11R. ("." meaning a plural number) are formed between the side surface portions 11S and 11S of the headrest base portion 4C, so as to reinforce the headrest base portion 4C. The ribs 11R, are vertically positioned in parallel. Further, upper end portions of the stays 4B and 4B are respectively inserted into the bottom surface portion 11D of the headrest base portion 4C, and are integrally fixed thereto.

Further, the stays 4B and 4B have tubular shapes and are secured to the bottom surface portion 11D such that opened upper end portions thereof are exposed to an upper surface side of the bottom surface portion 11D. Further, wave-shaped elongated holes 11H are formed in the side surface portions 11S and 11S of the headrest base portion 4C. The elongated holes 11H and 11H are formed by cutting out the side surface portions 11S and 11S in a thickness direction thereof. The elongated holes 11H and 11H have first stopper grooves H1 and second stopper grooves H2 that are formed between lower end portions H0 and H0 and upper end portions H3 and H3. The first stopper grooves H1 and the second stopper grooves H2 are depressed rearwardly (rightwardly in the drawings) in a wave-like and step-like fashion.

Next, referring to FIG. 14 again, a pair of connection links 12 and 12 are made of a synthetic resin. The connection links 12 and 12 may function as connection members that link the headrest base portion 4C and the support portion 4A to each other. The connection links 12 and 12 are positioned on the support portion 4A so as to be laterally spaced from each other, and their end portions are respectively rotatably connected to an upper end portion of the headrest base portion 4C and a rear surface of the support portion 4A.

In particular, the rear end portions of the connection links 12 and 12 are rotatably supported by a connection shaft 12A that passes through the side surface portions 11S and 11S of the headrest base portion 4C. Further, as shown in FIG. 17, the rear end portions of the connection links 12 and 12 are positioned between the side surface portions 11S and 11S and the ribs 11R and 11R positioned inside thereof. Thus, the connection links 12 and 12 are rotatably supported by the connection shaft 12A that extends between the side surface portions 11S and 11S.

Referring to FIG. 14 again, the front end portions of the connection links 12 and 12 are rotatably supported by connection shafts 12B and 12B that are laterally positioned on the rear surface of the support portion 4A. The connection shafts 12A and 12B are positioned so as to be parallel to each other. The above-described connection links 12 and 12 are arranged, when rotated clockwise about the connection shaft 12A that rotatably supports the rear end portions thereof, to contact the top surface portion 11U of the headrest base portion 4C, so that their clockwise rotation can be restrained.

Next, a pair of support members 13 and 13 are formed as extension members that integrally extend rearwardly from the rear surface of the support portion 4A. The support members 13 and 13 are positioned on the support portion 4A so as to be laterally spaced from each other. The support portion 4A is made of a synthetic resin. Further, the support portion 4A is integrally formed so as to have an entirely curved plate-shape. Further, rear end portions of the support members 13 and 13 formed in the rear surface of the support portion 4A are connected to each other by a connection shaft 13A that extends in a width direction.

In particular, as shown in FIG. 17, the rear end portions of the support members 13 and 13 are positioned between the ribs 11R and 11R positioned outside thereof and the ribs 11R, 11R positioned inside thereof. Further, the connection shaft 13A that connects the rear end portions of the support members 13 and 13 is positioned so as to be parallel to the connection shaft 12A and the connection shafts 12B and 12B described above.

End portions of the connection shaft 13A are passed through the elongated holes 11H and 11H that are formed in the side surface portions 11S and 11S of the headrest portion 4C. Therefore, the connection shaft 13A is capable of sliding back and forth and up and down only within a range defined by the profiles of elongated holes 11H and 11H. Further, the ribs 11R. (FIG. 17) that are formed between the side surface portions 11S and 11S are shaped so as to not interfere with the connection shaft 13A that moves within the elongated holes 11H and 11H.

Figure 12:
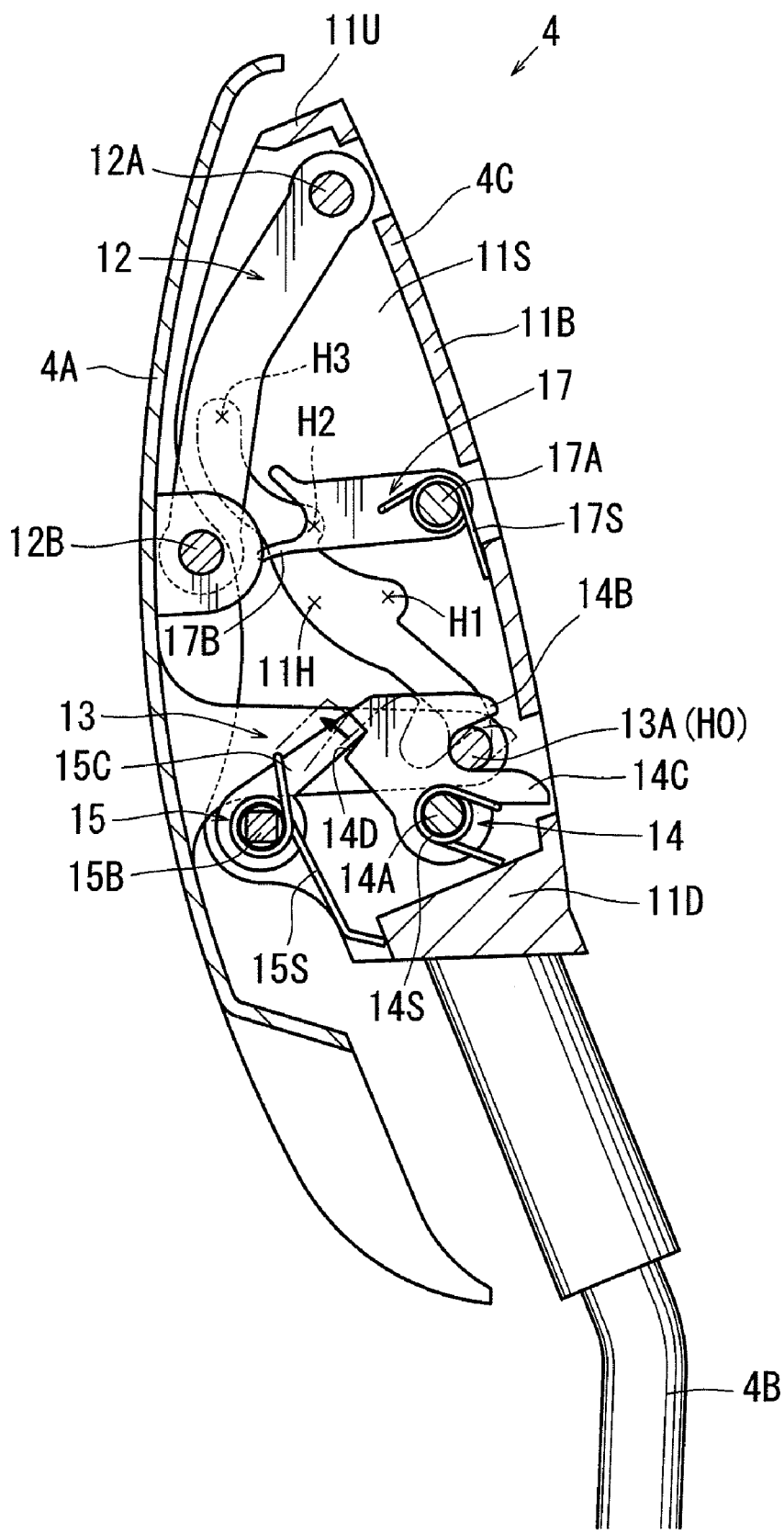
FIG. 12 is a schematic view of internal structure of a headrest moving mechanism, which corresponds to a sectional view taken along line XII-XII of FIG. 17.

Next, as shown in FIG. 12, a pair of hooks 14 and 14 are formed to cam shapes as a whole and are disposed in the headrest base portion 4C. The hooks 14 and 14 are positioned at a lower end portion of the headrest base portion 4C so as to be laterally spaced from each other. The hooks 14 and 14 are provided as restraint members that are capable of restraining movement of the connection shaft 13A moving within the elongated holes 11H and 11H at an initial position thereof. As shown in FIG. 17, the hooks 14 and 14 are positioned between the side surface portions 11S and 11S and the ribs 11R and 11R positioned inside thereof and are respectively rotatably supported by connection shafts 14A and 14A that extend therebetween.

Referring to FIG. 12 again, formed in each of the hooks 14 and 14 is a claw-shaped upper jaw portion 14B and a claw-shaped lower jaw portion 14C that extend radially outwardly thereof. Each of the upper jaw portion 14B and the lower jaw portion 14C is positioned in two positions on outer circumferential portions of the hook 14. As a result, formed between the upper jaw portions 14B and 14B and the lower jaw portions 14C and 14C are recesses that are capable of receiving the above-mentioned connection shaft 13A therein. The connection shafts 14A and 14A are positioned so as to be parallel to the connection shafts 12A and 12B and the connection shaft 13A.

Further, torsion springs 14S and 14S are disposed between the hooks 14 and 14 and the headrest base portion 4C described above. The torsion springs 14S and 14S are disposed while they are previously twisted. The hooks 14 and 14 are biased by the torsion springs 14S and 14S so as to be rotated counterclockwise from a position shown in FIG. 12. Further, step-shaped engagement grooves 14D and 14D are formed in the outer circumferential portions of the hooks 14 and 14.

The engagement grooves 14D and 14D are respectively positioned opposite to a pair of engagement arm portions 15C and 15C that are formed in the engagement-disengagement member 15 which will be described hereinafter, and engage thereto. Thus, the hooks 14 and 14 can be maintained in a condition in which counterclockwise rotation thereof by biasing forces is restrained. In the condition in which the counterclockwise rotation of the hooks 14 and 14 is restrained, the hooks 14 and 14 can maintain the connection shaft 13A in a condition in which the connection shaft 13A is retained in the lower end portions H0 and H0 of the elongated holes 11H and 11H while the connection shaft 13A is received in the recesses formed between the upper jaw portions 14B and 14B and the lower jaw portions 14C and 14C.

As shown in FIG. 11, the connection shaft 13A is normally biased toward the connection shaft 12A by a biasing force of the tension spring 16 that is disposed between the connection shaft 13A and the connection shaft 12A, so as to be biased toward the upper end portions H3 and H3 along the profiles of the elongated holes 11H and 11H. However, the connection shaft 13A is normally maintained in the condition (an initial condition) in which the connection shaft 13A is retained in the lower end portions H0 and H0 of the elongated holes 11H and 11H by the hooks 14 and 14 against the biasing force of the tension spring 16.

Further, referring to FIG. 12 again, when the engagement arm portions 15C and 15C are disengaged from the hooks 14 and 14 upon counterclockwise rotation thereof, the hooks 14 and 14 can rotate counterclockwise by biasing forces of the torsion springs 14S and 14S. As a result, as indicated by broken lines in FIG. 12, the upper jaw portions 14B and 14B of the hooks 14 and 14 are moved out of the elongate holes 11H and 11H, and the lower jaw portions 14C and 14C are pushed up from below, so as to be exposed to the elongated holes 11H and 11H.

Figure 13:
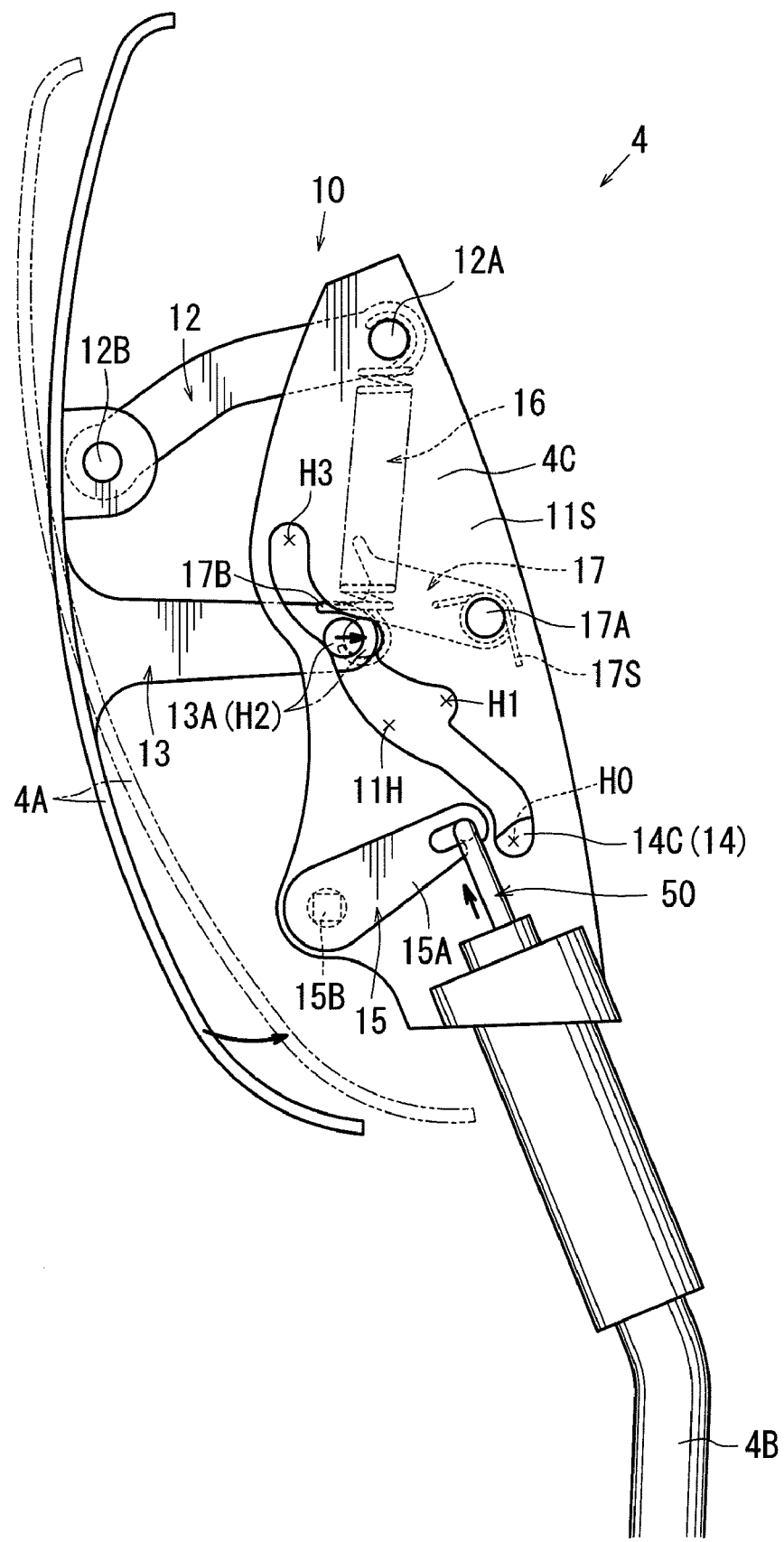
FIG. 13 is a side view, which illustrates a condition in which the support portion of the headrest is being moved toward a head.

Thus, the condition in which the connection shaft 13A is retained by the hooks 14 and 14 is canceled. As a result, as shown in FIGS. 13 and 14, the connection shaft 13A moves forwardly and upwardly along the profiles of the elongated holes 11H and 11H by the biasing force of the tension spring 16. As a result, the support portion 4A relatively moves forwardly and upwardly with respect to the headrest base portion 4C while rotating the connection links 12 and 12.

Referring to FIG. 12 again, the engagement arm portions 15C and 15C that can restrain the counterclockwise rotation of the hooks 14 and 14 are positioned so as to be laterally spaced from each other, and are positioned so as to be capable of engaging the hooks 14 and 14. In particular, as shown in FIG. 17, similar to the hooks 14 and 14, the engagement arm portions 15C and 15C are positioned between the side surface portions 11S and 11S and the ribs 11R and 11R positioned inside thereof.

Further, the engagement arm portions 15C and 15C are rotatably supported by a connection shaft 15B that extends between the side surface portions 11S and 11S. The connection shaft 15B is integrally connected to the engagement arm portions 15C and 15C and is rotatably supported by the side surface portions 11S and 11S. The connection shaft 15B is positioned so as to be parallel to the connection shafts 12A and 12B and the connection shaft 13A.

Further, a torsion spring 15S is dispose between one of the engagement arm portions 15C and the headrest base portion 4C. The torsion spring 15S is disposed while it is previously twisted. As shown in FIG. 12, the torsion spring 15S biases the engagement arm portions 15C and 15C clockwise. Thus, the engagement arm portions 15C and 15C are normally maintained in a condition in which they are pressed to the outer circumferential portions of the hooks 14 and 14 while distal ends of the engagement arm portions 15C and 15C respectively engage the step-shaped engagement grooves 14D and 14D.

When the engagement arm portions 15C and 15C engage the engagement grooves 14D and 14D, the engagement arm portions 15C and 15C and the engagement grooves 14D and 14D are oppositely contact each other, so that biased rotation thereof are mutually restrained. Further, referring to FIG. 11 again, an operation arm portion 15A is integrally connected to an end portion of the connection shaft 15B that is connected to the engagement arm portions 15C and 15C described above.

The operation arm portion 15A is arranged so as to be rotated by the push rod 50 described above. When the vehicle back-side collision happens and the push rod 50 is pushed upwardly, the operation arm portion 15A is rotated counterclockwise. As a result, as shown in FIG. 12, the operation arm portion 15A rotates the engagement arm portions 15C and 15C in the same direction, thereby disengaging the engagement arm portions 15C and 15C from the hooks 14 and 14. Thus, a condition in which the support portion 4A is retained in the initial position can be canceled, so that the support portion 4A is transferred forwardly and upwardly by the biasing force of the tension spring 16.

As shown in FIG. 14, forward and upward movement of the support portion 4A is restrained and stopped when the connection shaft 13A reaches the upper end portions H3 and H3 of the elongated holes 11H and 11H. Further, in a condition in which the movement of the support portion 4A is stopped, the support portion 4A cannot be pushed back rearwardly even if the support portion 4A is applied with a loading from the head of the sitting person. That is, when the connection shaft 13A reaches the upper end portions H3 and H3 of the elongated holes 11H and 11H, the connection links 12 and 12 connected to the supported portion 4A contact the top surface portion 11U of the headrest base portion 4C, so as to positioned in a condition in which clockwise rotation thereof is restrained.

In the condition in which the clockwise rotation of the connection links 12 and 12 is restrained, when the support portion 4A is applied with an action force that urges the same to move rearwardly, the connection links 12 and 12 are applied with a force that urges the same to press against the top surface portion 11U of the headrest base portion 4C. Therefore, even if the support portion 4A is applied with a pressing force as described above, the support portion 4A is prevented from being rotated counterclockwise. As a result, the support portion 4A can catch the head of the sitting person in the collision preparatory position. Further, as shown in FIG. 13, the support portion 4A can be prevented from being pushed back rearwardly if it is pressed by the head of the sitting person while it is moving forwardly.

That is, when the connection shaft 13A is applied with a force that urges the same to move rearwardly while the support portion 4A is moving forwardly, the connection shaft 13A can enter the first stopper grooves H1 and H1 or the second stopper grooves H2 and H2 that are formed in the elongated holes 11A and 11A so as to be depressed rearwardly (rightwardly in the drawings) in the step-like fashion. As a result, rearward movement of the connection shaft 13A is restrained, so that the support portion 4A can be maintained in positions on the way of forward movement thereof.

Therefore, even when the support portion 4A does not yet reach the collision preparatory position, the head of the sitting person can be caught by the support portion 4A. Further, FIG. 17 shows a condition in which the connection shaft 13A is placed in the second stopper grooves H2 and H2. Referring to FIG. 11 again, attached to the headrest base portion 4C are a pair of lever members 17 and 17 that are formed by arm-shaped members.

The lever members 17 and 17 are positioned so as to be laterally spaced from each other, and their rear end portions are respectively rotatably connected to the headrest base portion 4C. In particular, as shown in FIG. 17, the rear end portions of the lever members 17 and 17 are positioned between the outer ribs 11R and 11R and the inner ribs 11R and 11R and are respectively rotatably supported by connection shafts 17A and 17A that extend therebetween.

Further, torsion springs 17S and 17S are disposed between the lever members 17 and 17 and the headrest base portion 4C. As shown in FIG. 11, the torsion springs 17S and 17S are wound around the connection shafts 17A and 17A. One end of each of the torsion springs 17S and 17S is connected to each of the lever members 17 and 17. The other end of each of the torsion springs 17S and 17S is connected to the headrest base portion 4C. Thus, the lever members 17 and 17 are normally maintained in a postural condition in which they are exposed to the elongated holes 11H and 11H by spring forces of the torsion springs 17S and 17S.

Spoon-shaped receiving portions 17B are respectively formed in left or forward end portions of the lever members 17 and 17 that are exposed to the elongated holes 11H and 11H. As shown in FIG. 13, when the connection shaft 13A moves upwardly from the lower ends H0 and H0 within the elongated holes 11H and 11H, the receiving portions 17B and 17B are pushed away by the connection shaft 13A, so as to be pushed out of the elongated holes 11H and 11H.

Figure 15:
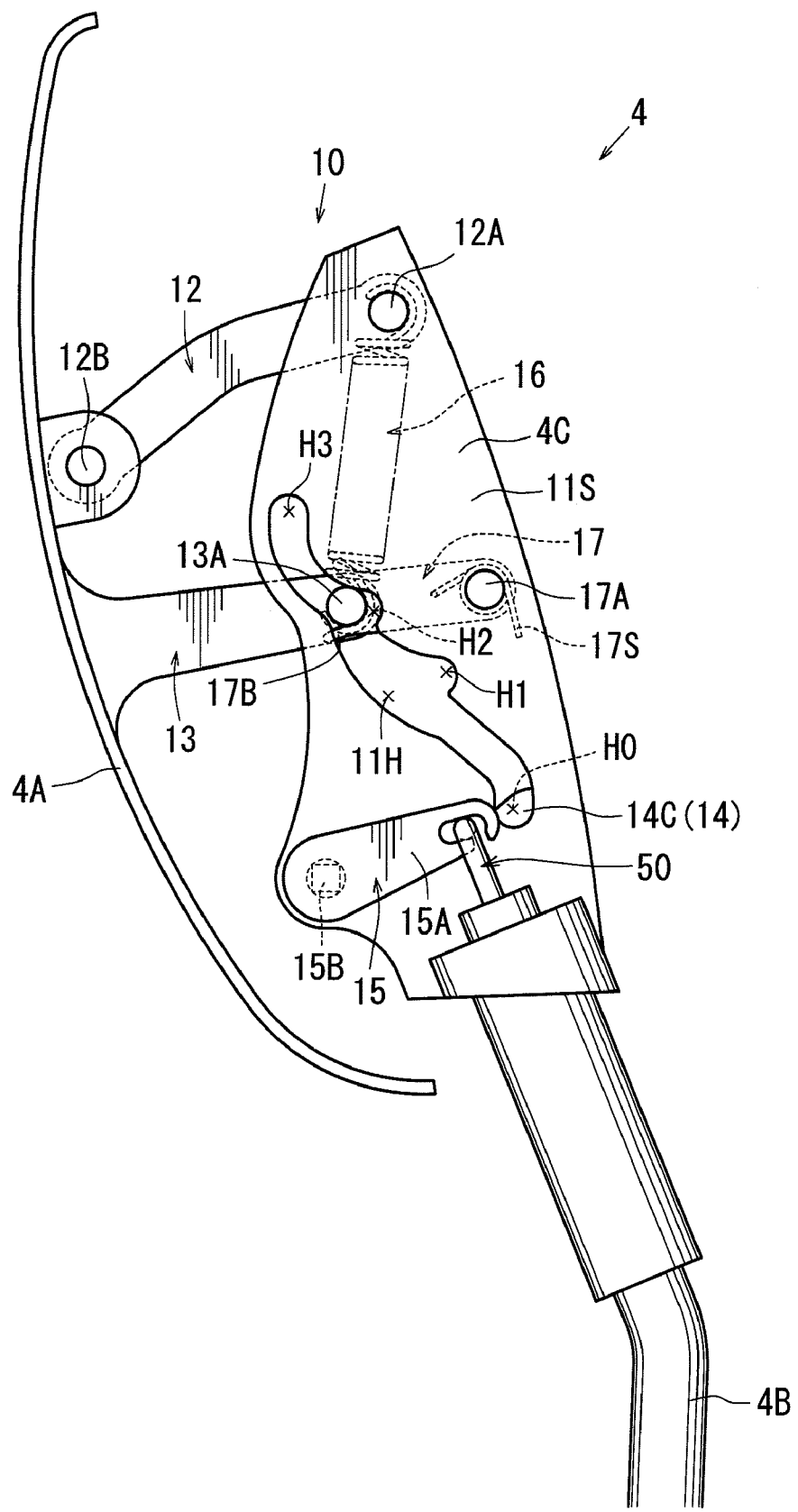
FIG. 15 is a side view, which illustrates a condition in which the support portion of the headrest is being moved from the position closer to the head toward the initial position.

However, as shown in FIG. 14, when the connection shaft 13A reaches the upper end portions H3 and H3 of the elongated holes 11H and 11H, the receiving portions 17B and 17B are returned to the postural condition in which they are exposed to the elongated holes 11H and 11H by the spring forces of the torsion springs 17S and 17S. Further, as shown in FIG. 15, when the connection shaft 13A is transferred within the elongated holes 11H and 11H downwardly from the upper end portions H3 and H3, the receiving portions 17B and 17B catch the connection shaft 13A by their spoon-shaped distal ends.

Figure 16:
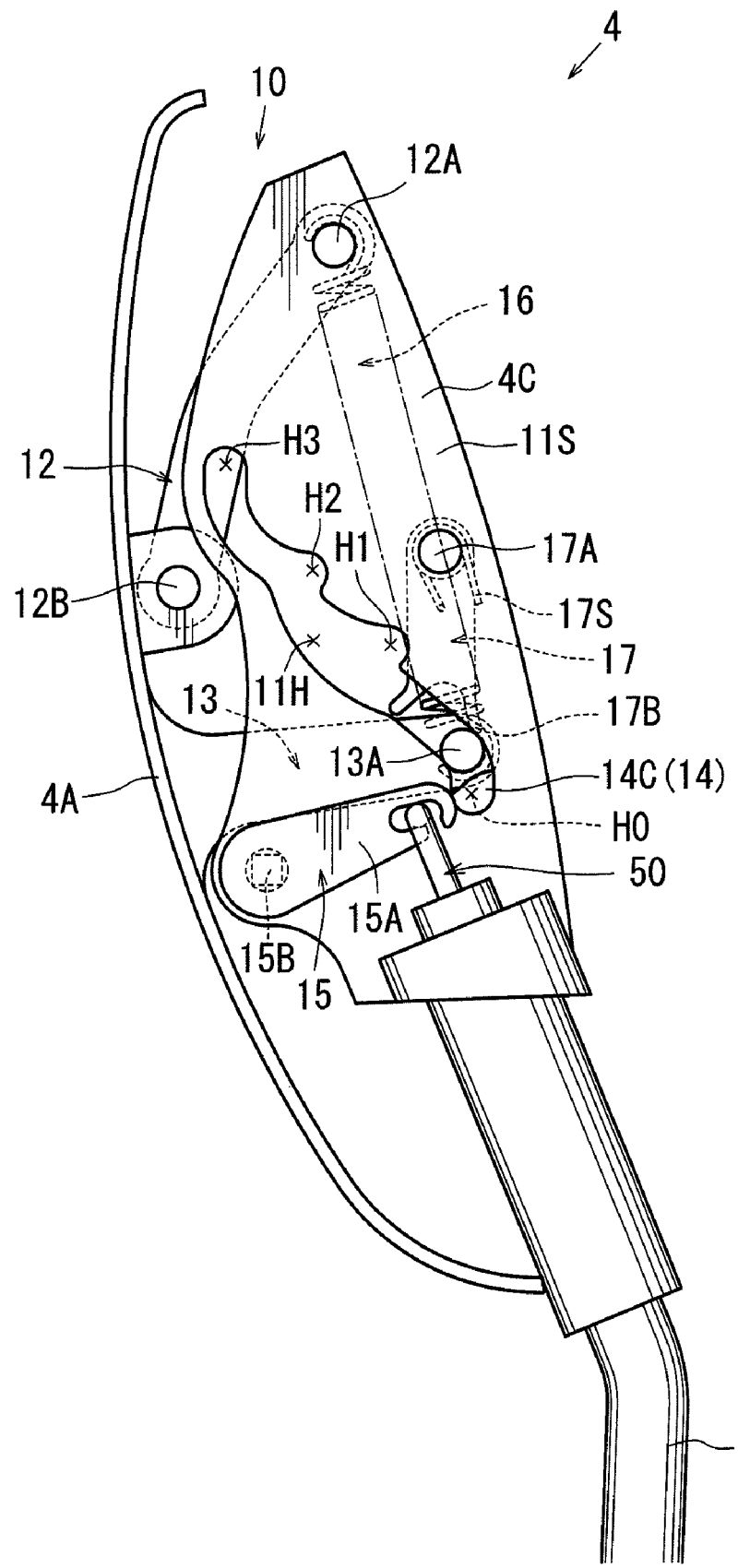
FIG. 16 is a side view, which illustrates a condition in which the support portion of the headrest is moved toward the initial position while it is guided.

Further, when, in this condition, the connection shaft 13A is further transferred downwardly, the lever members 17 and 17 are pushed and rotated counterclockwise in the drawing while they are pressed by the connection shaft 13A that is caught by the receiving portions 17B and 17B. As shown in FIG. 16, the connection shaft 13A, when transferred to a portion closer to the lower end portions H0 and H0 while it is guided by the lever members 17 and 17, is disengaged from the receiving portions 17B and 17B.

Thus, the connection shaft 13A, when transferred downwardly from the upper end portions H3 and H3 within the elongated holes 11H and 11H, is smoothly transferred to the lower end portions H0 and H0 while it is guided by the lever members 17 and 17, so as to not enter the first stopper grooves H1 and H1 or the second stopper grooves H2 and H2. Further, because the connection shaft 13A is operated so as to be pressed toward the lower end portions H0 and H0 of the elongated holes 11H and 11H, the connection shaft 13A reaches the lower end portions H0 and H0 while pressing down the lower jaw portions 14C and 14C of the hooks 14 and 14 that are exposed to the lower end portions H0 and H0.

As a result, as shown in FIG. 12, the hooks 14 and 14 are rotated clockwise in the drawing, so as to be placed in a postural condition in which the upper jaw portions 14B and 14B thereof are positioned over the upper side of the connection shaft 13A. The hooks 14 and 14, when placed in the condition as described above, engage the engagement arm portions 15C and 15C, so as to be is locked again in a condition in which the connection shaft 13A is maintained in the initial position. As a result, the support portion 4A is maintained again in a condition in which it is returned to the posture of the initial position thereof, i.e., a position before it is moved forwardly.

Next, a method of using the embodiment is described. Referring to FIG. 1, in the normal condition in which the vehicle back-side collision does not yet happen, the vehicle seat 1 is in a condition in which the support portion 4A of the headrest 4 is maintained in the posture of the initial position thereof. When the vehicle back-side collision happens, the sitting person is pressed against the seat back 2 by impact of the collision, so that the seat back loading is produced. As a result, the pressure receiving member 20 is pressed rearwardly by the seat back loading a corresponding operational force is transferred via the operation cable 40 and the push rod 50, so that the engagement-disengagement member 15 is rotated.

Thus, the support portion 4A is released from a condition in which it is retained in the initial position. As a result, as shown in FIG. 14, the support portion 4A moves to the collision preparatory position by the biasing force of the tension spring 16. Further, the support portion 4A that is moved to the collision preparatory position can receive the head of the sitting person that is inclined rearwardly by the impact of the back-side collision from a back-side of the head.

One embodiment of the present invention is described hereinbefore. However, the present invention can be carried out in various forms. For example, as disclosed in Japanese Laid-Open Patent Publication No. 2005-104259, the headrest moving mechanism can be constructed such that when the operation cable 40 is moved by a desired distance, the support portion 4A of the headrest 4 can directly move in an advancing direction by a distance corresponding to the moving distance thereof. In addition, the mechanism for moving the support portion 4A forwardly can be constructed using a four-joints link mechanism.

Further, the outer cable of the second cable is not necessarily constructed of the stay. That is, the outer cable of the second cable can be constructed of a tubular member that is additionally provided. Further, each of the first cable and the second cable does not necessarily has the double layer cable structure that is constructed of the inner cable and the outer cable. That is, each of the first cable and the second cable may have a single layer cable structure. Further, the cable connection structure of the present invention is not limited to the embodiment described above in which the cables respectively disposed within the headrest and the seat back are connected to each other. Therefore, the cable connection structure can be applied to various structures for axially connecting two cable each other.

Further, the insertion grooves formed in the support, the reception grooves formed in the stay, and the engagement projections formed in the operation cable are not necessary formed so as to be axisymmetrical with each other. For example, a single insertion groove, a single reception groove and a single engagement projection can respectively be circumferentially formed in the stay, the support and the operation cable. Further, the coil spring is exemplified as the spring member that is capable of biasing the operation cable into the support. However, a torsion spring or other such springs can be used as the spring member. Further, the guide that is capable of guiding the coil spring with the insertion motion of the operation cable into the support can be omitted. However, when the guide is omitted, the operation cable must be inserted into the support while screwing the coil spring.

The invention claimed is:

1. A cable connection structure for axially connecting a first cable and a second cable to each other, wherein axial connection of the first cable and the second cable is performed by a cylindrical connection member that is constrained from axially moving, wherein a connection end portion of the first cable is provided with a radially outwardly projected engagement projection, further wherein a connection end portion of the second cable is formed with an axially extended reception groove that is capable of axially receiving the engagement projection, wherein the first cable is constructed such that when the connection end portion of the first cable is inserted axially into the cylindrical connection member from one side, the engagement projection can be axially received along an insertion groove that is formed in the cylindrical connection member, wherein the insertion groove is shaped such that an axial terminal end portion of the insertion groove into which the engagement projection is inserted is bent in one circumferential direction, and when the engagement projection reaches a terminal end position of the insertion groove, the engagement projection is maintained in a condition in which dual-directional axial movement thereof with respect to the connection member is restrained, wherein a reception groove formed in the connection end portion of the second cable is shaped such that an axial terminal end portion of the reception groove into which the engagement projection is inserted is bent in the other circumferential direction opposite to the insertion groove, further wherein when the connection end portion of the second cable is axially inserted into the cylindrical connection member from the other side thereof, the engagement projection of the first cable retained in the cylindrical connection member is axially received along the reception groove of the second cable, further wherein when the engagement projection reaches a terminal end position of the reception groove that is bent in the other circumferential direction, the engagement projection is removed from the terminal end position of the insertion groove of the connection member and as a result, the engagement projection is released from a condition in which axial movement thereof with respect to the connection member is restrained and is placed in a condition in which axial movement thereof with respect to the second cable is restrained, wherein in the condition in which the engagement projection reaches the terminal end position of the reception groove of the second cable and axial movement thereof is restrained, the engagement projection is retained in the terminal end portion of the reception groove by an axially extended portion of the insertion groove that is formed in the connection member and as a result, the cables can be axially integrally connected to each other so as to axially move while the cables are integrated with each other, and wherein the first cable is provided with a spring member that is capable of engaging the connection member and rotationally biasing the connection end portion of the first cable in one circumferential direction when the first cable is inserted into the connection member, further wherein the engagement projection provided to the connection end portion of the first cable is transferred to the terminal end position of the insertion groove that is bent in one circumferential direction by a biasing force of the spring member, so as to be elastically retained therein.

2. The cable connection structure as defined in claim 1, wherein one end portion of the spring member engages the first cable and the other end portion of the spring member engages the insertion groove formed in the connection member while being screwed, so that the connection end portion of the first cable can be rotationally biased in one circumferential direction, and wherein a guide is formed in a reception side end of the connection member through which the first cable is axially inserted, the guide engaging the other end portion of the spring member with the insertion motion of the first cable and guiding the other end portion of the spring member such that the other end portion of the spring member can be moved toward the insertion groove while being screwed in the other circumferential direction.

* * * * *